US010005657B2

(12) United States Patent
Lim et al.

(10) Patent No.: US 10,005,657 B2
(45) Date of Patent: Jun. 26, 2018

(54) DISPENSING SYSTEM AND USER INTERFACE

(71) Applicant: PepsiCo, Inc., Purchase, NY (US)

(72) Inventors: Stephen Lim, Chappaqua, NY (US); Christine J. Sisler, Shrub Oak, NY (US); Mathieu R. Badimon, New York, NY (US); Massimo F. D'Amore, Lausanne (CH); Mikel Durham, Cos Cob, CT (US); Camiel Flohr, New York, NY (US); John W. Vail, Croton on Hudson, NY (US)

(73) Assignee: PepsiCo, Inc., Purchase, NY (US)

( * ) Notice: Subject to any disclaimer, the term of this patent is extended or adjusted under 35 U.S.C. 154(b) by 245 days.

(21) Appl. No.: 14/976,344

(22) Filed: Dec. 21, 2015

(65) Prior Publication Data

US 2016/0101972 A1 Apr. 14, 2016

Related U.S. Application Data

(63) Continuation of application No. 13/664,848, filed on Oct. 31, 2012, now Pat. No. 9,218,704.
(Continued)

(51) Int. Cl.
*G06F 3/048* (2013.01)
*B67D 1/08* (2006.01)
(Continued)

(52) U.S. Cl.
CPC ......... *B67D 1/0878* (2013.01); *B67D 1/0017* (2013.01); *B67D 1/0872* (2013.01);
(Continued)

(58) Field of Classification Search
CPC .................................................. B67D 1/0878
(Continued)

(56) References Cited

U.S. PATENT DOCUMENTS 2,949,993 A 8/1960 Adler
3,184,714 A 5/1965 Brown, Jr.
(Continued)

FOREIGN PATENT DOCUMENTS

DE 202009015375 4/2010
DE 202010001631 5/2010
(Continued)

OTHER PUBLICATIONS

International Application No PCT/US2012/062814—International Search Report dated Mar. 7, 2013.
(Continued)

*Primary Examiner* — William Titcomb
(74) *Attorney, Agent, or Firm* — Sterne, Kessler, Goldstein & Fox P.L.L.C.

(57) ABSTRACT

A dispensing system may be configured to dispense a custom product based on a user selection. The user selection may be provided via a user interface of the dispensing system. The user interface may simultaneously display selectable icons for the available types of products (e.g., types of beverages) and other icons for modifying a chosen product (e.g., a flavoring or additive to a beverage, such as a sweetener or a cherry flavoring). The user interface may receive input from a user in order for the user to select a custom product (e.g., a custom drink) and the dispensing system may dispense the custom product to the user.

19 Claims, 16 Drawing Sheets

Related U.S. Application Data

(60) Provisional application No. 61/554,184, filed on Nov. 1, 2011.

(51) Int. Cl.
 *G07F 13/06* (2006.01)
 *G06F 3/0481* (2013.01)
 *G06F 3/0482* (2013.01)
 *G06F 3/0484* (2013.01)
 *G06F 3/0488* (2013.01)
 *B67D 1/00* (2006.01)

(52) U.S. Cl.
 CPC ......... *B67D 1/0888* (2013.01); *G06F 3/0482* (2013.01); *G06F 3/0488* (2013.01); *G06F 3/04817* (2013.01); *G06F 3/04842* (2013.01); *G06F 3/04886* (2013.01); *G07F 13/065* (2013.01)

(58) Field of Classification Search
 USPC ........................................................ 715/838
 See application file for complete search history.

(56) References Cited

U.S. PATENT DOCUMENTS

| | | |
|---|---|---|
| 3,242,929 A | 3/1966 | Adams |
| 3,254,749 A | 6/1966 | Scherer |
| 3,318,428 A | 5/1967 | Klein |
| 3,357,530 A | 12/1967 | Yamamoto |
| 3,379,295 A | 4/1968 | Varley |
| 3,397,763 A | 8/1968 | Wahlberg |
| 3,445,633 A | 5/1969 | Ratner |
| 3,448,895 A | 6/1969 | Mesh |
| 3,653,480 A | 4/1972 | Yamamoto et al. |
| 3,786,421 A | 1/1974 | Wostl et al. |
| 3,790,957 A | 2/1974 | Dukes et al. |
| 3,896,915 A | 7/1975 | Hayashi et al. |
| 3,935,933 A | 2/1976 | Tanaka et al. |
| 3,984,660 A | 10/1976 | Oka et al. |
| 4,124,109 A | 11/1978 | Bissell et al. |
| 4,171,737 A | 10/1979 | McLaughlin |
| 4,185,730 A | 1/1980 | Roes et al. |
| 4,199,100 A | 4/1980 | Wostl et al. |
| 4,271,351 A | 6/1981 | Bloodworth |
| 4,276,999 A | 7/1981 | Reichenberger |
| 4,377,049 A | 3/1983 | Simon et al. |
| 4,411,351 A | 10/1983 | Lowder et al. |
| 4,412,292 A | 10/1983 | Sedam et al. |
| 4,450,535 A | 5/1984 | de Pommery et al. |
| 4,469,150 A | 9/1984 | Grimaldi |
| 4,487,333 A | 12/1984 | Pounder et al. |
| 4,499,982 A | 2/1985 | Sugimoto et al. |
| 4,499,985 A | 2/1985 | Schuller |
| 4,529,968 A | 7/1985 | Hilsum et al. |
| 4,549,675 A | 10/1985 | Austin |
| 4,554,419 A | 11/1985 | King et al. |
| 4,568,785 A | 2/1986 | Jaecker |
| 4,658,988 A | 4/1987 | Hassell |
| 4,674,041 A | 6/1987 | Lemon et al. |
| 4,747,516 A | 5/1988 | Baker |
| 4,766,548 A | 8/1988 | Cedrone et al. |
| 4,777,354 A | 10/1988 | Thomas |
| 4,809,837 A | 3/1989 | Hayashi |
| 4,812,629 A | 3/1989 | O'Neil et al. |
| 4,817,689 A | 4/1989 | Stembridge et al. |
| 4,821,925 A | 4/1989 | Wiley et al. |
| 4,827,426 A | 5/1989 | Patton et al. |
| 4,866,190 A | 9/1989 | Tordeux et al. |
| 4,866,661 A | 9/1989 | de Prins |
| 4,882,675 A | 11/1989 | Nichtberger et al. |
| 4,900,906 A | 2/1990 | Punic |
| 4,947,028 A | 8/1990 | Gorog |
| 4,961,447 A | 10/1990 | Credle, Jr. et al. |
| 4,967,808 A | 11/1990 | Credle, Jr. et al. |
| 4,971,120 A | 11/1990 | Credle, Jr. et al. |
| 4,977,300 A | 12/1990 | Schroeder |
| 4,979,639 A | 12/1990 | Hoover et al. |
| 4,979,641 A | 12/1990 | Turner |
| 5,047,613 A | 9/1991 | Swegen et al. |
| 5,062,555 A | 11/1991 | Whigham et al. |
| 5,074,341 A | 12/1991 | Credle, Jr. et al. |
| 5,091,713 A | 2/1992 | Horne et al. |
| 5,095,710 A | 3/1992 | Black et al. |
| 5,102,011 A | 4/1992 | Whigham et al. |
| 5,103,649 A | 4/1992 | Kieffer |
| 5,113,974 A | 5/1992 | Vayda |
| 5,147,021 A | 9/1992 | Maruyama et al. |
| 5,201,395 A | 4/1993 | Takizawa et al. |
| 5,206,488 A | 4/1993 | Teicher |
| 5,212,954 A | 5/1993 | Black et al. |
| 5,235,509 A | 8/1993 | Mueller et al. |
| 5,243,174 A | 9/1993 | Veeneman et al. |
| 5,290,033 A | 3/1994 | Bittner et al. |
| 5,367,452 A | 11/1994 | Gallery et al. |
| 5,409,092 A | 4/1995 | Itako et al. |
| 5,420,406 A | 5/1995 | Izawa et al. |
| 5,442,567 A | 8/1995 | Small |
| 5,450,938 A | 9/1995 | Rademacher |
| 5,454,406 A | 10/1995 | Rejret et al. |
| 5,491,326 A | 2/1996 | Marceau et al. |
| 5,499,330 A | 3/1996 | Lucas et al. |
| 5,500,514 A | 3/1996 | Veeneman et al. |
| 5,513,117 A | 4/1996 | Small |
| 5,520,275 A | 5/1996 | Foglino |
| 5,546,303 A | 8/1996 | Helbing |
| 5,555,497 A | 9/1996 | Helbling |
| 5,567,926 A | 10/1996 | Asher et al. |
| 5,588,557 A | 12/1996 | Topar |
| 5,621,874 A | 4/1997 | Lucas et al. |
| 5,625,562 A | 4/1997 | Veeneman et al. |
| 5,652,421 A | 7/1997 | Veeneman et al. |
| 5,657,388 A | 8/1997 | Weiss |
| 5,685,435 A | 11/1997 | Picioccio et al. |
| 5,731,981 A | 3/1998 | Simard |
| 5,748,908 A | 5/1998 | Yu |
| 5,754,981 A | 5/1998 | Veeneman et al. |
| D395,297 S | 6/1998 | Cheng et al. |
| 5,774,874 A | 6/1998 | Veeneman et al. |
| D398,299 S | 9/1998 | Ballay et al. |
| 5,803,320 A | 9/1998 | Cutting et al. |
| 5,816,443 A | 10/1998 | Bustos |
| 5,836,481 A | 11/1998 | Strohmeyer et al. |
| 5,880,733 A | 3/1999 | Horvitz et al. |
| 5,898,435 A | 4/1999 | Nagahara et al. |
| 5,905,992 A | 5/1999 | Lucas et al. |
| 5,907,141 A | 5/1999 | Deaville et al. |
| 5,912,668 A | 6/1999 | Sciammarella et al. |
| 5,923,413 A | 7/1999 | Laskowski |
| 5,947,334 A | 9/1999 | Rudick et al. |
| 5,959,869 A | 9/1999 | Miller et al. |
| 5,960,997 A | 10/1999 | Forsythe |
| 5,963,203 A | 10/1999 | Goldberg et al. |
| 5,967,367 A | 10/1999 | Orsborn |
| 5,984,180 A | 11/1999 | Albrecht |
| 5,997,236 A | 12/1999 | Picioccio et al. |
| 6,006,227 A | 12/1999 | Freeman et al. |
| 6,021,362 A | 2/2000 | Maggard et al. |
| 6,021,626 A | 2/2000 | Goodman |
| 6,023,275 A | 2/2000 | Horvitz et al. |
| 6,044,952 A | 4/2000 | Haggerty et al. |
| 6,047,807 A | 4/2000 | Molbak |
| 6,053,359 A | 4/2000 | Goulet et al. |
| 6,054,989 A | 4/2000 | Robertson et al. |
| 6,056,194 A | 5/2000 | Kolls |
| 6,073,840 A | 6/2000 | Marion |
| 6,078,888 A | 6/2000 | Johnson, Jr. |
| 6,098,879 A | 8/2000 | Terranova |
| 6,101,266 A | 8/2000 | Laskowski et al. |
| 6,119,135 A | 9/2000 | Helfman |
| 6,138,106 A | 10/2000 | Walker et al. |
| 6,144,366 A | 11/2000 | Numazaki |
| 6,158,655 A | 12/2000 | DeVries, Jr. et al. |
| 6,160,899 A | 12/2000 | Lee et al. |

(56) References Cited

U.S. PATENT DOCUMENTS

| | | |
|---|---|---|
| 6,176,782 B1 | 1/2001 | Lyons et al. |
| 6,182,895 B1 | 2/2001 | Albrecht |
| 6,193,154 B1 | 2/2001 | Phillips et al. |
| 6,198,483 B1 | 3/2001 | Launais |
| 6,230,150 B1 | 5/2001 | Walker et al. |
| 6,236,736 B1 | 5/2001 | Crabtree et al. |
| 6,240,397 B1 | 5/2001 | Sachs |
| 6,256,046 B1 | 7/2001 | Waters et al. |
| 6,293,469 B1 | 9/2001 | Masson et al. |
| 6,315,197 B1 | 11/2001 | Beardsley |
| 6,321,802 B1 | 11/2001 | Weeks et al. |
| D459,361 S | 6/2002 | Inagaki |
| 6,419,161 B1 | 7/2002 | Haddad et al. |
| 6,439,454 B1 | 8/2002 | Masson et al. |
| 6,457,038 B1 | 9/2002 | Defosse |
| 6,466,237 B1 | 10/2002 | Miyao et al. |
| 6,478,192 B2 | 11/2002 | Heyes |
| 6,484,863 B1 | 11/2002 | Molbak |
| 6,493,970 B1 | 12/2002 | McCarthy et al. |
| 6,494,776 B1 | 12/2002 | Molbak |
| 6,570,582 B1 | 5/2003 | Sciammarella et al. |
| 6,573,983 B1 | 6/2003 | Laskowski |
| 6,584,309 B1 | 6/2003 | Whigham |
| 6,602,125 B2 | 8/2003 | Martin |
| 6,633,849 B1 | 10/2003 | Dodd |
| 6,638,313 B1 | 10/2003 | Freeman et al. |
| 6,658,323 B2 | 12/2003 | Tedesco et al. |
| 6,681,031 B2 | 1/2004 | Cohen et al. |
| 6,694,058 B1 | 2/2004 | Burchart et al. |
| 6,722,573 B2 | 4/2004 | Haddad et al. |
| 6,725,427 B2 | 4/2004 | Freeman et al. |
| 6,729,957 B2 | 5/2004 | Burns et al. |
| 6,729,958 B2 | 5/2004 | Burns et al. |
| 6,736,251 B2 | 5/2004 | Molhak |
| 6,736,725 B2 | 5/2004 | Burns et al. |
| 6,746,330 B2 | 6/2004 | Cannon |
| 6,758,316 B2 | 7/2004 | Molbak |
| 6,768,999 B2 | 7/2004 | Prager et al. |
| 6,774,986 B2 | 8/2004 | Laskowski |
| 6,784,874 B1 | 8/2004 | Shimizu |
| 6,793,130 B2 | 9/2004 | Veeneman |
| 6,801,637 B2 | 10/2004 | Voronka et al. |
| 6,834,452 B2 | 12/2004 | Martin et al. |
| 6,854,581 B2 | 2/2005 | Molhak |
| 6,950,534 B2 | 9/2005 | Cohen et al. |
| 6,954,732 B1 | 10/2005 | DeLapa et al. |
| 6,957,125 B1 | 10/2005 | Rifkin |
| 6,976,570 B2 | 12/2005 | Moihak |
| 7,006,993 B1 | 2/2006 | Cheong et al. |
| 7,010,594 B2 | 3/2006 | Defosse |
| 7,013,337 B2 | 3/2006 | Defosse et al. |
| 7,020,680 B2 | 3/2006 | Defosse |
| 7,028,827 B1 | 4/2006 | Molbak et al. |
| 7,031,804 B2 | 4/2006 | Brooke, Jr. et al. |
| 7,036,094 B2 | 4/2006 | Cohen et al. |
| 7,051,291 B2 | 5/2006 | Sciammarella et al. |
| 7,065,710 B2 | 6/2006 | Hayashi et al. |
| 7,131,580 B2 | 11/2006 | Molbak |
| 7,139,006 B2 | 11/2006 | Wittenburg et al. |
| 7,164,884 B2 | 1/2007 | Defosse et al. |
| 7,167,892 B2 | 1/2007 | Defosse et al. |
| 7,171,451 B2 | 1/2007 | Defosse |
| 7,181,501 B2 | 2/2007 | Defosse |
| 7,194,422 B1 | 3/2007 | St. John |
| 7,231,372 B1 | 6/2007 | Prange et al. |
| 7,268,692 B1 | 9/2007 | Lieberman et al. |
| 7,275,991 B2 | 10/2007 | Burns et al. |
| D555,663 S | 11/2007 | Nagata et al. |
| 7,302,156 B1 | 11/2007 | Lieberman et al. |
| D556,770 S | 12/2007 | O'Donnell et al. |
| 7,303,119 B2 | 12/2007 | Molbak |
| 7,315,828 B1 | 1/2008 | McCarthy et al. |
| 7,330,035 B2 | 2/2008 | Van Berkel |
| 7,333,095 B1 | 2/2008 | Lieberman et al. |
| 7,333,602 B2 | 2/2008 | Habu |
| 7,350,158 B2 | 3/2008 | Yamaguchi et al. |
| D571,821 S | 6/2008 | Amacker |
| D573,605 S | 7/2008 | Amacker |
| 7,419,425 B1 | 9/2008 | Crowder, Jr. et al. |
| 7,434,177 B1 | 10/2008 | Ording et al. |
| 7,437,005 B2 | 10/2008 | Drucker et al. |
| 7,445,133 B2 | 11/2008 | Ludovissie et al. |
| 7,446,784 B2 | 11/2008 | Crew et al. |
| 7,454,363 B1 | 11/2008 | Rowe |
| 7,460,690 B2 | 12/2008 | Cohen et al. |
| 7,464,802 B2 | 12/2008 | Gerrity et al. |
| 7,468,785 B2 | 12/2008 | Lieberman |
| 7,477,241 B2 | 1/2009 | Lieberman et al. |
| 7,503,014 B2 | 3/2009 | Tojo et al. |
| 7,513,417 B2 | 4/2009 | Burns et al. |
| 7,520,374 B2 | 4/2009 | Martin et al. |
| D591,765 S | 5/2009 | Amacker |
| 7,527,193 B2 | 5/2009 | Molbak |
| 7,536,654 B2 | 5/2009 | Anthony et al. |
| D594,026 S | 6/2009 | Ball et al. |
| 7,559,460 B2 | 7/2009 | Burns et al. |
| 7,564,469 B2 | 7/2009 | Cohen |
| D598,466 S | 8/2009 | Hirsch et al. |
| 7,573,465 B2 | 8/2009 | Lieberman et al. |
| 7,577,496 B2 | 8/2009 | Walker et al. |
| 7,581,186 B2 | 8/2009 | Dowdy et al. |
| D599,367 S | 9/2009 | Mays et al. |
| D599,368 S | 9/2009 | Kanga et al. |
| D599,370 S | 9/2009 | Murchie et al. |
| D599,806 S | 9/2009 | Brown et al. |
| 7,584,883 B2 | 9/2009 | Meek et al. |
| 7,593,867 B2 | 9/2009 | Deakin et al. |
| 7,603,321 B2 | 10/2009 | Gurvey |
| D603,415 S | 11/2009 | Lin et al. |
| D605,200 S | 12/2009 | Sakai |
| 7,624,895 B2 | 12/2009 | Haskayne |
| 7,636,679 B2 | 12/2009 | Song et al. |
| D608,365 S | 1/2010 | Walsh et al. |
| 7,653,599 B2 | 1/2010 | Doran et al. |
| D609,243 S | 2/2010 | Song |
| D609,715 S | 2/2010 | Chaudhri |
| 7,654,452 B2 | 2/2010 | Gravelle |
| 7,668,340 B2 | 2/2010 | Cohen et al. |
| D611,053 S | 3/2010 | Kanga et al. |
| D611,484 S | 3/2010 | Mays et al. |
| D611,485 S | 3/2010 | Marashi |
| 7,684,592 B2 | 3/2010 | Paul et al. |
| 7,685,163 B2 | 3/2010 | Chaudhri |
| D613,300 S | 4/2010 | Chaudhri |
| D614,640 S | 4/2010 | Viegers et al. |
| D615,098 S | 5/2010 | Winjum |
| D615,989 S | 5/2010 | Chaudhri |
| D616,458 S | 5/2010 | Pearson et al. |
| D616,459 S | 5/2010 | Pearson et al. |
| D616,460 S | 5/2010 | Pearson et al. |
| 7,720,709 B1 | 5/2010 | Langer et al. |
| 7,747,522 B1 | 6/2010 | Walker et al. |
| 7,781,722 B2 | 8/2010 | Lieberman et al. |
| 7,783,532 B2 | 8/2010 | Hsu et al. |
| 7,797,641 B2 | 9/2010 | Karukka et al. |
| D624,927 S | 10/2010 | Allen et al. |
| D624,932 S | 10/2010 | Chaudhri |
| 7,806,294 B2 | 10/2010 | Gatipon et al. |
| 7,810,676 B2 | 10/2010 | Romanyszyn et al. |
| 7,813,834 B2 | 10/2010 | Sudolcan et al. |
| D628,210 S | 11/2010 | Luke et al. |
| 7,865,432 B2 | 1/2011 | Doran et al. |
| 7,874,478 B2 | 1/2011 | Molbak |
| 7,885,726 B2 | 2/2011 | Walker et al. |
| 7,889,182 B2 | 2/2011 | Romanvszyn et al. |
| 7,895,120 B2 | 2/2011 | Walker et al. |
| D633,920 S | 3/2011 | Luke et al. |
| D634,750 S | 3/2011 | Loretan et al. |
| D634,753 S | 3/2011 | Loretan et al. |
| 7,912,580 B2 | 3/2011 | Walker et al. |
| D636,785 S | 4/2011 | Brinda |
| D637,198 S | 5/2011 | Furuya et al. |
| D637,606 S | 5/2011 | Luke et al. |
| D638,432 S | 5/2011 | Flik et al. |

(56) References Cited

U.S. PATENT DOCUMENTS

| | | |
|---|---|---|
| 7,941,758 B2 | 5/2011 | Tremblay |
| 7,966,577 B2 | 6/2011 | Chaudbri et al. |
| 7,979,809 B2 | 7/2011 | Sunday |
| D696,264 S | 12/2013 | D'Amore et al. |
| D696,265 S | 12/2013 | D'Amore et al. |
| D696,266 S | 12/2013 | D'Amore et al. |
| 8,739,840 B2 | 6/2014 | Mattos et al. |
| 8,744,618 B2 | 6/2014 | Peters et al. |
| 8,757,222 B2 | 6/2014 | Rudick et al. |
| 2001/0011365 A1 | 8/2001 | Helfman |
| 2001/0018808 A1 | 9/2001 | Bar-Yona |
| 2001/0021920 A1 | 9/2001 | Ikeda |
| 2001/0024512 A1 | 9/2001 | Yoronka et al. |
| 2001/0042121 A1 | 11/2001 | Defosse et al. |
| 2001/0047410 A1 | 11/2001 | Defosse |
| 2001/0054083 A1 | 12/2001 | Defosse |
| 2002/0016829 A1 | 2/2002 | Defosse |
| 2002/0023027 A1 | 2/2002 | Simonds |
| 2002/0054164 A1 | 5/2002 | Uemura |
| 2002/0091569 A1 | 7/2002 | Kitaura et al. |
| 2002/0107610 A1 | 8/2002 | Kaehler et al. |
| 2002/0161476 A1 | 10/2002 | Panofsky et al. |
| 2002/0194387 A1 | 12/2002 | Defosse |
| 2003/0003865 A1 | 1/2003 | Defosse et al. |
| 2003/0028284 A1 | 2/2003 | Chirnomas |
| 2003/0055735 A1 | 3/2003 | Cameron et al. |
| 2003/0097474 A1 | 5/2003 | Defosse et al. |
| 2003/0138130 A1 | 7/2003 | Cohen et al. |
| 2003/0146905 A1 | 8/2003 | Pihlaja |
| 2003/0150146 A1 | 8/2003 | Martin et al. |
| 2003/0164856 A1 | 9/2003 | Prager et al. |
| 2003/0195816 A1 | 10/2003 | Dziaba et al. |
| 2004/0078332 A1 | 4/2004 | Ferguson et al. |
| 2004/0100479 A1 | 5/2004 | Nakano et al. |
| 2004/0128257 A1 | 7/2004 | Okamoto et al. |
| 2004/0133653 A1 | 7/2004 | Defosse et al. |
| 2004/0155907 A1 | 8/2004 | Yamaguchi et al. |
| 2004/0161132 A1 | 8/2004 | Cohen et al. |
| 2004/0211210 A1 | 10/2004 | Crisp |
| 2004/0217124 A1 | 11/2004 | Crisp |
| 2004/0237048 A1 | 11/2004 | Tojo et al. |
| 2004/0250217 A1 | 12/2004 | Tojo et al. |
| 2004/0255254 A1 | 12/2004 | Weingart et al. |
| 2005/0044485 A1 | 2/2005 | Mondry et al. |
| 2005/0105772 A1 | 5/2005 | Voronka et al. |
| 2005/0107912 A1 | 5/2005 | Martin et al. |
| 2005/0108158 A1 | 5/2005 | Prisant |
| 2005/0154675 A1 | 7/2005 | Johnson |
| 2005/0182678 A1 | 8/2005 | Walker et al. |
| 2005/0251287 A1 | 11/2005 | Thornton et al. |
| 2006/0013440 A1 | 1/2006 | Cohen et al. |
| 2006/0059426 A1 | 3/2006 | Ogikubo |
| 2006/0069997 A1 | 3/2006 | Hsieh et al. |
| 2006/0095338 A1 | 5/2006 | Seidel |
| 2006/0109283 A1 | 5/2006 | Shipman et al. |
| 2006/0116167 A1 | 6/2006 | Raviv et al. |
| 2006/0161473 A1 | 7/2006 | Defosse |
| 2006/0167967 A1 | 7/2006 | Defosse |
| 2006/0183422 A1 | 8/2006 | Defosse et al. |
| 2006/0210112 A1 | 9/2006 | Cohen et al. |
| 2006/0214953 A1 | 9/2006 | Crew et al. |
| 2007/0050083 A1 | 3/2007 | Signorelli et al. |
| 2007/0067738 A1 | 3/2007 | Flynt et al. |
| 2007/0083287 A1 | 4/2007 | Defosse et al. |
| 2007/0083911 A1 | 4/2007 | Madden et al. |
| 2007/0097234 A1 | 5/2007 | Katayama |
| 2007/0112907 A1 | 5/2007 | Defosse |
| 2007/0114244 A1 | 5/2007 | Gatipon et al. |
| 2007/0210153 A1 | 9/2007 | Walker et al. |
| 2007/0211031 A1 | 9/2007 | Marc |
| 2007/0240079 A1 | 10/2007 | Flynt et al. |
| 2007/0237541 A1 | 12/2007 | George et al. |
| 2008/0013913 A1 | 1/2008 | Lieberman et al. |
| 2008/0033824 A1 | 2/2008 | Packes et al. |
| 2008/0047762 A1 | 2/2008 | Lieberman et al. |
| 2008/0052090 A1 | 2/2008 | Heinemann et al. |
| 2008/0062141 A1 | 3/2008 | Chandhri |
| 2008/0066016 A1 | 3/2008 | Dowdy et al. |
| 2008/0068353 A1 | 3/2008 | Lieberman et al. |
| 2008/0093542 A1 | 4/2008 | Lieberman et al. |
| 2008/0122870 A1 | 5/2008 | Brodersen et al. |
| 2008/0126261 A1 | 5/2008 | Lovett |
| 2008/0153567 A1 | 6/2008 | Juds et al. |
| 2008/0172306 A1 | 7/2008 | Schorr et al. |
| 2008/0173707 A1 | 7/2008 | Walker et al. |
| 2008/0192015 A1 | 8/2008 | Lieberman |
| 2008/0256494 A1 | 10/2008 | Greenfield |
| 2008/0262648 A1 | 10/2008 | Kriston et al. |
| 2008/0263452 A1 | 10/2008 | Tomkins |
| 2008/0282202 A1 | 11/2008 | Sunday |
| 2009/0002335 A1 | 1/2009 | Chaudhri |
| 2009/0021665 A1 | 1/2009 | Shiao et al. |
| 2009/0024530 A1 | 1/2009 | Porter et al. |
| 2009/0069931 A1 | 3/2009 | Peters et al. |
| 2009/0069934 A1 | 3/2009 | Newman et al. |
| 2009/0070234 A1 | 3/2009 | Peters et al. |
| 2009/0074248 A1 | 3/2009 | Cohen et al. |
| 2009/0084269 A1 | 4/2009 | Pozzari et al. |
| 2009/0100383 A1 | 4/2009 | Sunday et al. |
| 2009/0120958 A1 | 5/2009 | Landers et al. |
| 2009/0141614 A1 | 6/2009 | Tanaka et al. |
| 2009/0160791 A1 | 6/2009 | Lieberman |
| 2009/0166375 A1 | 7/2009 | Butler et al. |
| 2009/0171804 A1 | 7/2009 | Lee et al. |
| 2009/0189873 A1 | 7/2009 | Peterson et al. |
| 2009/0198592 A1 | 8/2009 | Emerson |
| 2009/0200453 A1 | 8/2009 | Lieberman et al. |
| 2009/0204473 A1 | 8/2009 | Sommerfeld |
| 2009/0216575 A1 | 8/2009 | Antao et al. |
| 2009/0216665 A1 | 8/2009 | Merwarth et al. |
| 2009/0216675 A1 | 8/2009 | Antao et al. |
| 2009/0222300 A1 | 9/2009 | Guith et al. |
| 2009/0222301 A1 | 9/2009 | Phillips et al. |
| 2009/0222339 A1 | 9/2009 | Antao et al. |
| 2009/0274339 A9 | 11/2009 | Cohen et al. |
| 2009/0313139 A1 | 12/2009 | Nam et al. |
| 2009/0315740 A1 | 12/2009 | Hildreth et al. |
| 2009/0322678 A1 | 12/2009 | Lashina et al. |
| 2010/0004781 A1 | 1/2010 | Walker et al. |
| 2010/0005427 A1 | 1/2010 | Zhang et al. |
| 2010/0007601 A1 | 1/2010 | Lashina et al. |
| 2010/0030355 A1 | 2/2010 | Insolia et al. |
| 2010/0036528 A1 | 2/2010 | Minard et al. |
| 2010/0082448 A1 | 4/2010 | Lin et al. |
| 2010/0084426 A1 | 4/2010 | Devers et al. |
| 2010/0100236 A1 | 4/2010 | Segal et al. |
| 2010/0103131 A1 | 4/2010 | Segal et al. |
| 2010/0114991 A1 | 5/2010 | Chaudhary et al. |
| 2010/0116842 A1 | 5/2010 | Hecht et al. |
| 2010/0155415 A1 | 6/2010 | Ashrafzadeh et al. |
| 2010/0191369 A1 | 7/2010 | Kim |
| 2010/0217685 A1 | 8/2010 | Melcher et al. |
| 2010/0226531 A1 | 9/2010 | Goto |
| 2010/0234986 A1 | 9/2010 | Clopton et al. |
| 2010/0241494 A1 | 9/2010 | Kumar et al. |
| 2010/0241999 A1 | 9/2010 | Russ et al. |
| 2010/0250372 A1 | 9/2010 | Smith et al. |
| 2010/0253637 A1 | 10/2010 | Lieberman et al. |
| 2010/0262282 A1 | 10/2010 | Segal et al. |
| 2010/0268792 A1 | 10/2010 | Butler et al. |
| 2010/0275267 A1 | 10/2010 | Walker et al. |
| 2010/0280921 A1 | 11/2010 | Stone et al. |
| 2010/0295772 A1 | 11/2010 | Alameh et al. |
| 2010/0295773 A1 | 11/2010 | Alameh et al. |
| 2010/0295781 A1 | 11/2010 | Alameh et al. |
| 2010/0299642 A1 | 11/2010 | Merrell et al. |
| 2010/0309169 A1 | 12/2010 | Lieberman et al. |
| 2010/0318225 A1 | 12/2010 | Claesson et al. |
| 2011/0022225 A1 | 1/2011 | Rothschild |
| 2011/0055718 A1 | 3/2011 | Tanaka et al. |
| 2011/0121032 A1 | 5/2011 | Deo et al. |
| 2011/0123688 A1 | 5/2011 | Deo et al. |
| 2011/0144801 A1 | 6/2011 | Selker et al. |
| 2011/0168290 A1 | 7/2011 | Breitenbach et al. |

(56) References Cited

U.S. PATENT DOCUMENTS

| | | |
|---|---|---|
| 2011/0172004 A1 | 7/2011 | Breitenbach et al. |
| 2011/0172814 A1 | 7/2011 | Breitenbach et al. |
| 2011/0172848 A1 | 7/2011 | Breitenbach et al. |
| 2011/0173041 A1 | 7/2011 | Breitenbach et al. |
| 2011/0173082 A1 | 7/2011 | Breitenbach et al. |
| 2012/0258216 A1 | 10/2012 | Wessels |

FOREIGN PATENT DOCUMENTS

| | | |
|---|---|---|
| EP | 0 546 782 | 5/1993 |
| EP | 0 989 091 | 3/2000 |
| EP | 2117122 | 11/2009 |
| FR | 2624844 | 6/1989 |
| FR | 2847357 | 5/2004 |
| FR | 2853423 | 10/2004 |
| FR | 2887659 | 12/2006 |
| FR | 2887660 | 12/2006 |
| GB | 2077063 | 12/1981 |
| GB | 2101088 | 1/1983 |
| GB | 2451646 | 2/2009 |
| JP | 2010063793 | 3/1920 |
| JP | 2000172916 | 6/2000 |
| JP | 2000276649 | 10/2000 |
| JP | 2006264733 | 10/2006 |
| JP | 07285597 | 5/2009 |
| JP | 2010067185 | 3/2010 |
| WO | WO 2010032887 | 3/1920 |
| WO | WO 9117949 | 11/1991 |
| WO | WO 9212489 | 7/1992 |
| WO | WO 9215968 | 9/1992 |
| WO | WO 9218954 | 10/1992 |
| WO | WO 9307085 | 4/1993 |
| WO | WO 9412953 | 6/1994 |
| WO | WO 9427226 | 11/1994 |
| WO | WO 9803945 | 1/1998 |
| WO | WO 9902449 | 1/1999 |
| WO | WO 0049556 | 8/2000 |
| WO | WO 00/72178 | 11/2000 |
| WO | WO 01/120 | 2/2001 |
| WO | WO 02057178 | 7/2002 |
| WO | WO 03066511 | 8/2003 |
| WO | WO 2006136696 | 12/2006 |
| WO | WO 2007/003062 | 1/2007 |
| WO | WO 2007/011241 | 1/2007 |
| WO | WO 2011/067157 | 6/2011 |

OTHER PUBLICATIONS

U.S. Appl. No. 13/116,247—Application as filed May 26, 2011.
U.S. Appl. No. 13/116,266—Application as filed May 26, 2011.
U.S. Appl. No. 13/451,948—Application as filed Apr. 20, 2012.
Zachary Wilson, "Coca-Cola's 100-Flavor Interactive Freestyle Soda Fountain in Action [video]", Jul. 21, 2009, available online at "www.fastcompany.com/1313153/coca-colas-100-flavor-interactive-freestyle-- soda-fountain-action-video", retrieved Oct. 31, 2012.

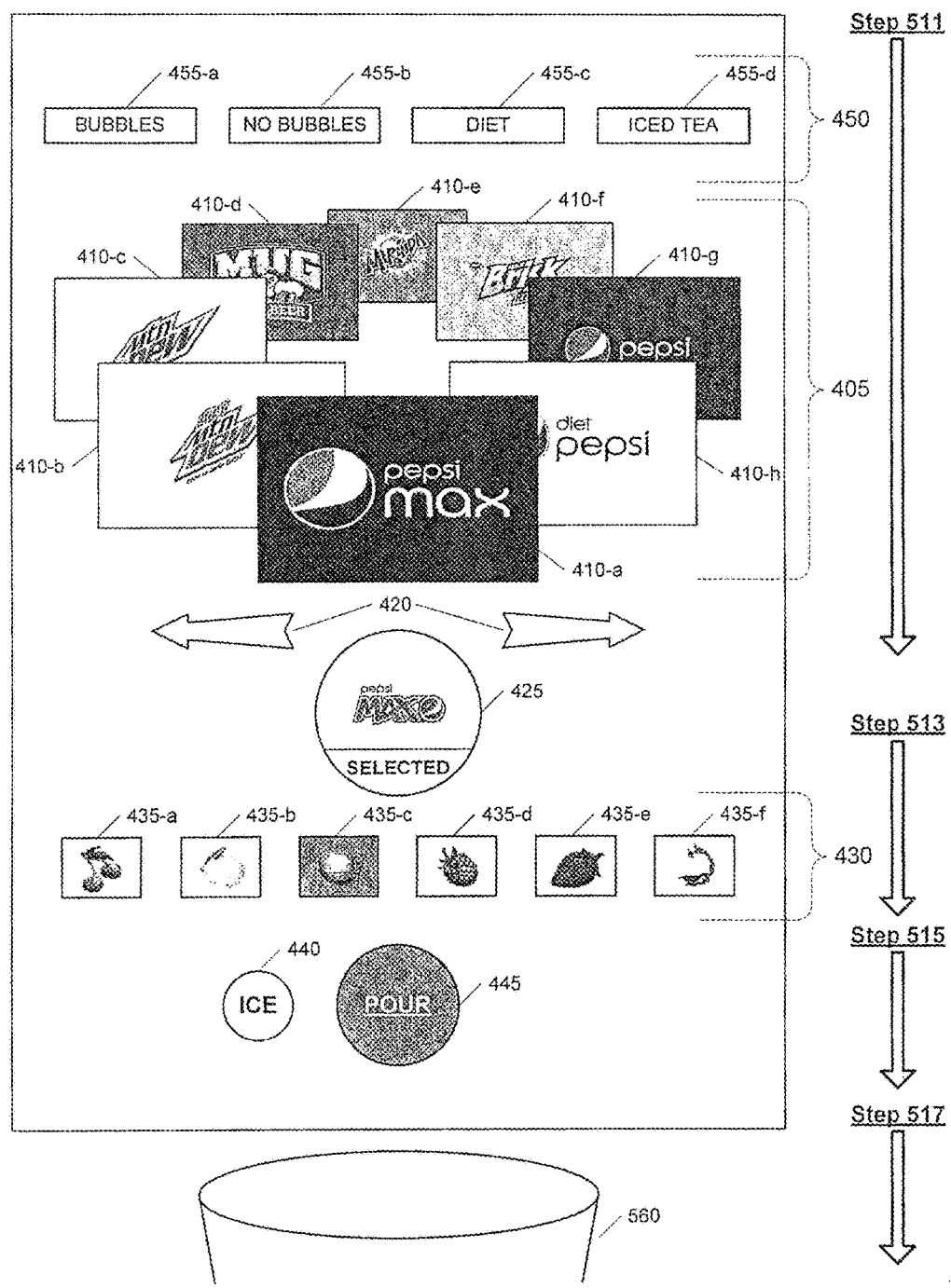

DISPENSING SYSTEM AND USER INTERFACE

CROSS-REFERENCE TO RELATED APPLICATIONS

This application is a continuation of U.S. application Ser. No. 13/664,848, filed Oct. 31, 2012, which claims the benefit of U.S. provisional application No. 61/554,184, filed Nov. 1, 2011, and entitled "DISPENSING SYSTEM AND USER INTERFACE." The above identified applications are incorporated herein by reference in their entirety.

BACKGROUND

Various dispensing systems, such as those at restaurants and other entertainment and/or food service venues, typically allow a user to select and receive a beverage, such as a soft-drink. A dispensing head is coupled to a drink syrup supply source via a single pipe dedicated to supply drink syrup to each dispensing head. A user places a cup under a logo corresponding to the selected beverage and either presses a button or presses the cup against a dispensing lever to activate the dispenser so that the selected beverage is delivered from the dispensing head corresponding to the selected beverage and into the cup until pressure is withdrawn from the button or lever.

A limited number of drinks are typically available at a conventional beverage dispenser. For example, drinks typically available at a conventional beverage dispenser are a regular cola beverage, a diet cola beverage, one or several non-cola carbonated beverages, such as a lemon-lime flavored carbonated beverage or some other fruit-flavored drink (e.g., orange flavored carbonated beverage, and/or root beer), and one more non-carbonated beverage(s), such as a tea and/or a lemonade.

The conventional beverage dispenser generally provides information about the available drinks using signage or labels for each type of drink (e.g., a label for each available soft-drink attached to the dispenser head corresponding the selected beverage). As the number of available drinks increases, it becomes more difficult to provide information related to the available drinks to a user.

There exists a need for an improved dispensing system and method to provide an increased number of available products (e.g., beverages) and to more efficiently provide information related to the available products.

SUMMARY

Described herein are methods and systems for providing an increased number of available products in a dispenser and/or for more efficiently providing information related to the products available in a dispenser.

One or more features relate to providing, on a display device of a dispenser, a display screen that is arranged to allow a user to select and cause dispensing of a custom beverage. In some arrangements, the user may progress down the display screen to make desired selections, such as selections of a desired brand of beverage and/or one or more flavorings that can be used as ingredients to the custom beverage. For example, in one or more embodiments, the display screen may include a first region comprising a plurality of icons that represent the types or brands of beverages available for dispensing from the dispenser as part of the custom beverage. Below the first region, the display screen may include a second region comprising a plurality of modifier buttons that represent flavorings or additives available for dispensing from the dispenser as part of the custom beverage. Below the first and second regions, the display screen may include a third region comprising a pour button that causes the dispenser to dispense the custom beverage.

In some arrangements, the display screen may present all information required to select and dispense a custom beverage to a user simultaneously. For example, the display screen could, among other features, simultaneously include icons for the types or brands of beverages available for dispensing from the dispenser, buttons for the flavorings or additives that can be added to as part of the custom beverage, and a pour button that causes the dispenser to dispense the custom beverage. Such arrangements may avoid more complex multi-layered methods of presenting information required to select and dispense a custom beverage.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

Certain embodiments are illustrated by way of example and not limited in the accompanying figures in which like reference numerals indicate similar elements and in which:

FIG. 5B illustrates an example of the progression of a user when using an interface to select and/or dispense a desired product according to various aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

The embodiments discussed below may be used to form a wide variety of products, such as beverages, including but not limited to cold and hot beverages, and including but not limited to beverages known under any PepsiCo branded name, such as Pepsi-Cola®.

Figure 1:
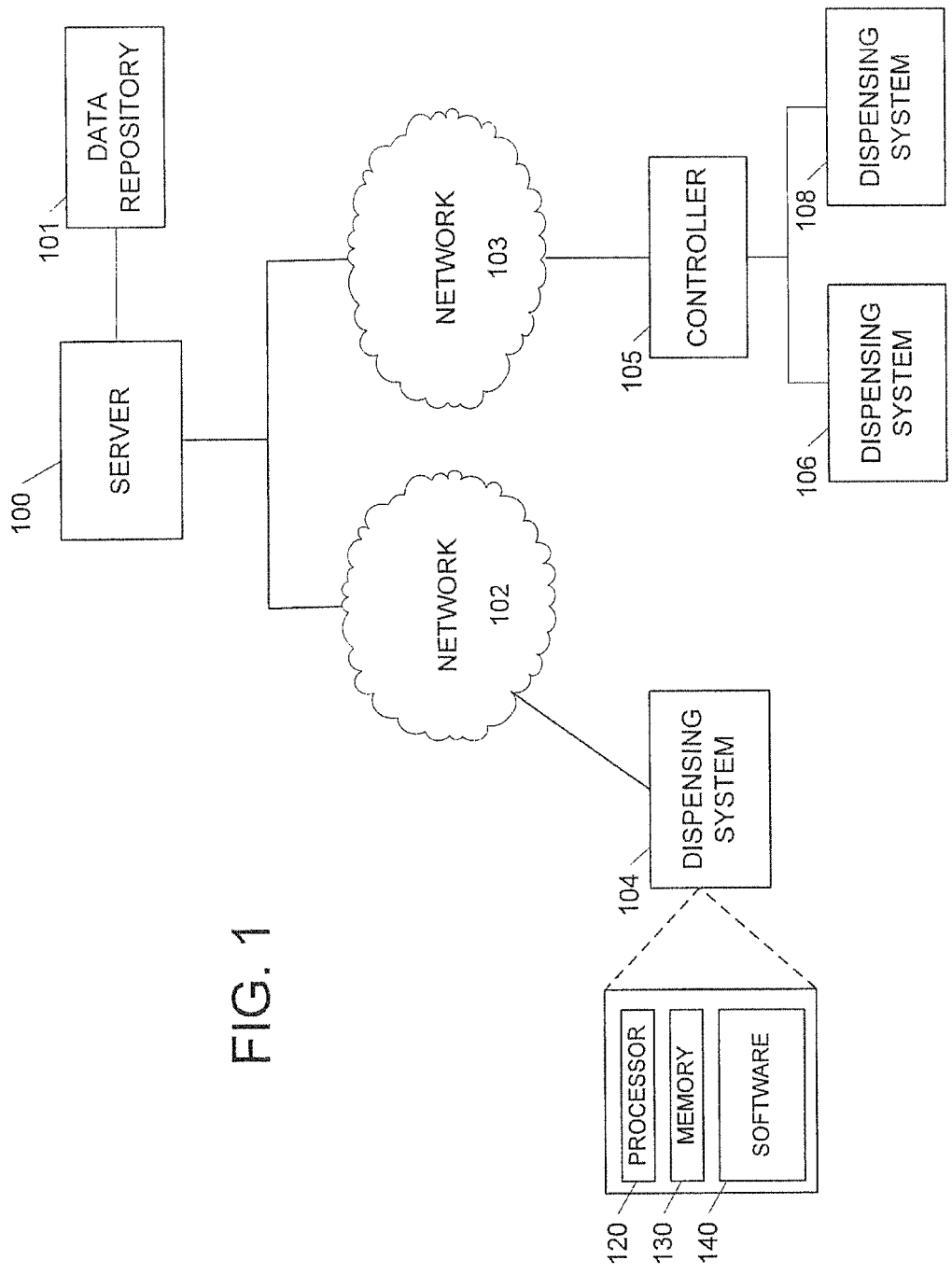
FIG. 1 illustrates a block diagram of an example communication network in which one or more embodiments may be implemented.

FIG. 1 illustrates a block diagram of an example communication network in which one or more embodiments may be implemented. A dispensing system may be configured to dispense a product according to a user's selection. For example, a user may approach dispensing system 104, and interact with the dispenser 104 to make a selection (e.g., input a code or press a button corresponding to the desired product). In response, the dispenser 104 may dispense the selected product. In general, examples of this disclosure relate to a beverage dispensing system; however, various aspects of this disclosure could be used in a dispenser for other types of products (e.g., candy or snack dispenser).

Dispensing systems may be located across different locations or premises. For example, FIG. 1 illustrates three dispensers: dispensing system 104, dispensing system 106 and dispensing system 108. In one arrangement, dispensing system 104 may be located in a convenience store, and dispensing systems 106 and 108 may be located at a school.

Additionally, in one or more arrangements, dispensing systems may be connected to a controller. A controller may be centrally located and/or a separate controller may be incorporated into each dispenser. As illustrated in FIG. 1, dispensing system 106 and 108 are connected to controller 105. Controller 105 may be configured to receive instructions from dispensing system 106 and/or 108, and to cause the appropriate dispensing system to dispense an appropriate amount of the selected product. For example, if dispensing system 106 is a beverage dispenser, a user may interact with the dispenser to select a beverage (e.g., via a touchpad, touch screen, keypad, etc.), instructions for the selected beverage may be transmitted to controller 105, and controller 105 may be configured to dispense an appropriate amount of the selected beverage in response to the instructions.

Components of a dispensing system may include a processor 120, memory 130, software 140, and/or additional components suitable for implementing the functions and methods of the dispensing system. Software 140 may be stored in computer-readable memory 130 such as read only or random access memory in dispenser 104 and may include instructions that cause one or more components (e.g., processor 120, display, etc.) of a dispenser (e.g., dispenser 104) to perform various functions and methods including those described herein.

A dispenser may communicate with other devices using one or more networks. For example, as illustrated in FIG. 1, dispensing system 104, 106 and 108 may communicate with server 100 via network 102 and/or network 103. Network 102 and network 103 may include multiple networks that are interlinked so as to provide internetworked communications. Such networks may include one or more private or public packet-switched networks (e.g., the Internet), one or more private or public circuit-switched networks (e.g., a public switched telephone network), a cellular network, a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or any other suitable network. Devices in communication with each other (e.g., dispensing systems 104, 106, and 108, server 100, and/or data repository 101) may use various communication protocols such as Internet Protocol (IP), Transmission Control Protocol (TCP), Simple Mail Transfer Protocol (SMTP), File Transfer Protocol (FTP), among others known in the art.

Server 100, controller 105, and dispensing systems 104, 106 and 108 may be configured to interact with each other and other devices. In one example, dispenser 104 may include software 140 that is configured to coordinate the transmission and reception of information to and from server 100. In one arrangement, software 140 may include application or server specific protocols for requesting and receiving data from server 100. For example, software 140 may comprise a browser or variants thereof and server 100 may comprise a web server. In some arrangements, server 100 may transmit application data to dispensing systems, such as software updates to various components of the dispensing system (e.g., updates to the user interface, updates to firmware of the dispensing system, updates to drivers of the dispensing system, etc.). In one or more arrangements, server 100 may receive data from the dispensing systems, such as data describing the current stock of the dispenser (e.g., a listing of products and the number remaining at the dispenser), operation history and/or usage metrics of the dispenser (e.g. counters tracking the selections of users of the machine), status of the dispenser (e.g., whether any components are working improperly), etc. Server 100 may be configured to access and store data in data repository 101, such as data that it receives and transmits in data repository 101. Data repository 101 may also include other data accessible to server 100, such as different drink recipes that can be downloaded to dispensers.

Figure 2:
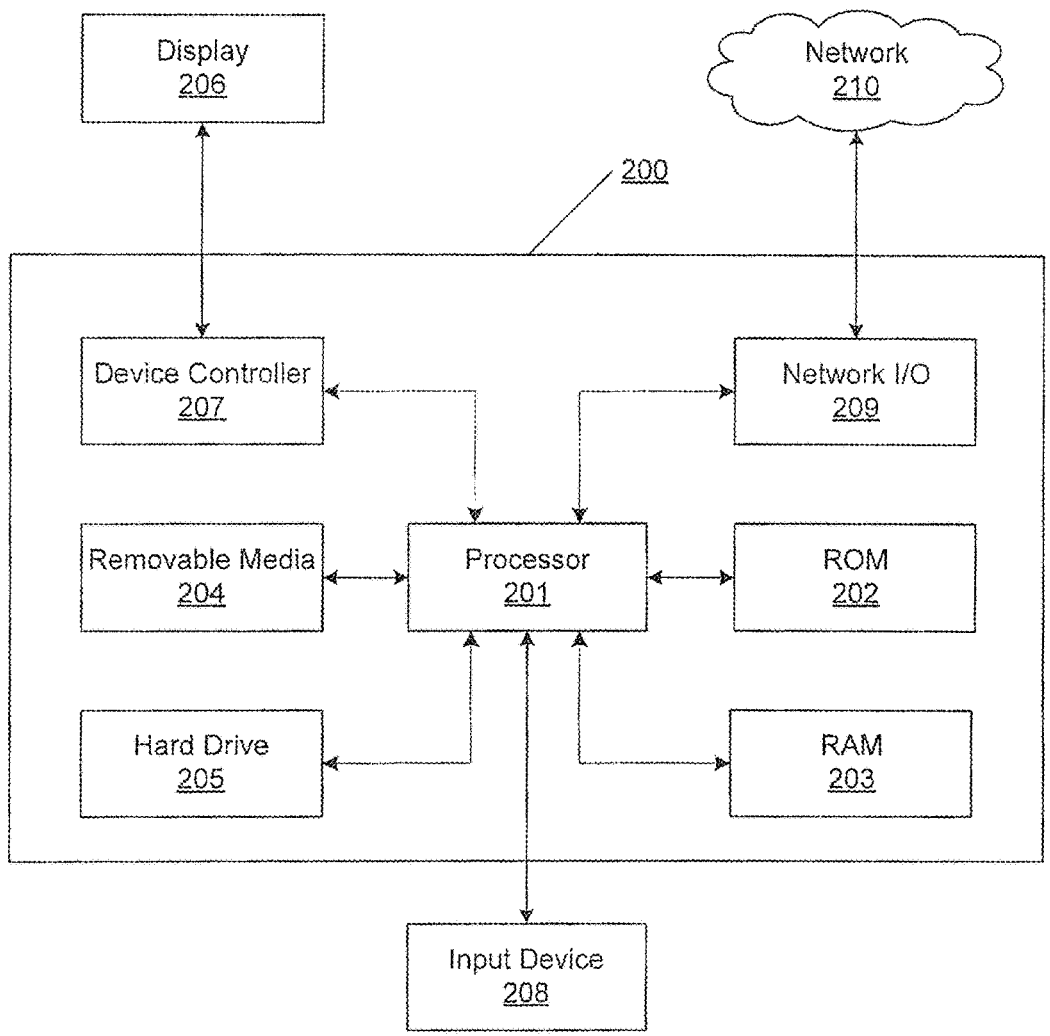
FIG. 2 illustrates an example hardware platform on which at least some of the various elements described herein can be implemented.
Figure 3:
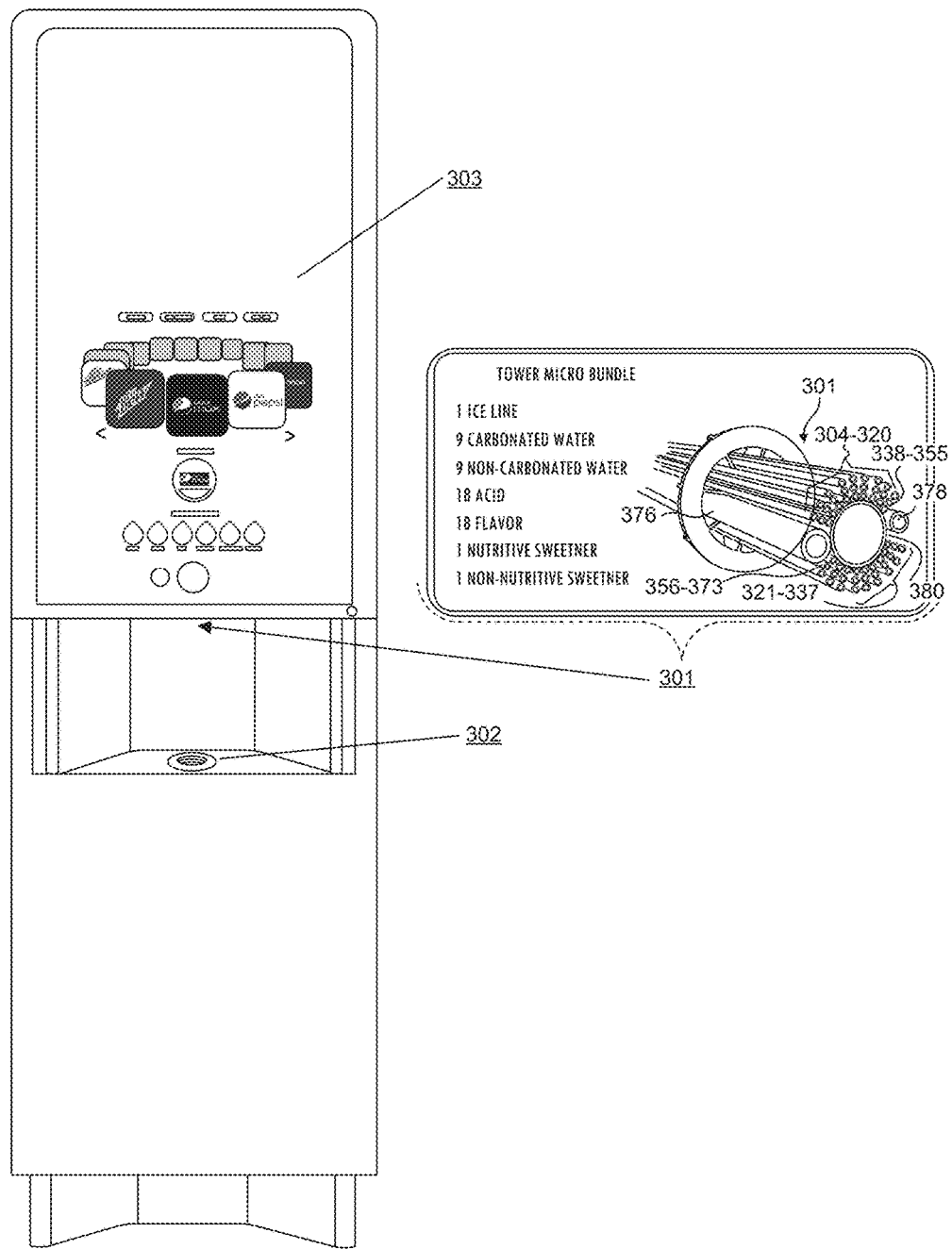
FIG. 3 is a schematic view of an embodiment of a dispensing system according to various aspects described herein.

FIG. 2 illustrates an example computing device on which at least some of the various elements described herein can be implemented, including, but not limited to, various components of dispenser systems (e.g., dispensers 104, 106 and 108, dispenser 300 of FIG. 3). Computing device 200 may include one or more processors 201, which may execute instructions of a computer program to perform, or cause to perform, any of the steps or functions described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, flash card, or any other desired electronic storage medium. Instructions may also be stored in an attached (or internal) hard drive 205.

Computing device 200 may include one or more output devices, such as a display 206, and may include one or more output device controllers 207, such as a video processor. There may also be one or more user input devices 208, such as a touch screen, remote control, keyboard, mouse, microphone, card reader, RFID reader, etc. The computing device 200 may also include one or more network interfaces, such as input/output circuits 209 to communicate with an external network 210. The network interface may be a wired interface, wireless interface, or a combination of the two. In some embodiments, the interface 209 may include a modem (e.g., a cable modem), and network 210 may include the communication lines of the networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user input device 208, etc.) may be used to implement any of the other computing devices and components described herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), controllers, application-specific integrated circuits (ASICS), combinations of hardware/firmware/software, and the like. Particular data structures may be used to more effectively implement one or more aspects of the invention, and such data structures are contemplated within the scope of computer executable instructions and computer-usable data described herein.

FIG. 3 is a schematic view of an embodiment of a dispensing system, in particular, a beverage dispenser. In some variations, beverage dispenser 300 may be approximately six feet tall, two feet wide, and three feet deep. Beverage dispenser 300 may be configured to dispense a beverage, such as a soft drink or a custom beverage made up of a base liquid (e.g., a brand of beverage) and one or more flavorings (e.g., lime, cherry, vanilla, and/or lemon flavorings). A user may make a beverage selection using touch screen 303 and/or other input components of the beverage dispenser 300. To receive the selected beverage, a user may place a cup or other suitable container (e.g., bottle, can, pouch) on or near shelf 302. When the container is in position to receive the selected beverage, the user may make selections on the touch screen 303 to cause the selected beverage to be dispensed from a dispensing head. FIG. 3, via item 301, shows an approximate placement of a dispensing head and a detail of a portion of a dispensing head. In one or more arrangements, a user may cause the dispensing of a drink by pressing a button (e.g., a button labeled "pour") or pressing the container against a dispensing lever to activate the dispenser. In some embodiments, the button may be an icon on touch screen 303, or an electrical push button located elsewhere on the chassis of beverage dispenser 300.

The beverage dispenser 300 can include various components for dispensing a beverage, such as one or more of the following: a dispensing head, for dispensing the products; one or more repositories that store the products or ingredients for generating the products; and transfer components, such as ingredient systems, mixing systems, and/or piping, for transferring the products or ingredients from the repositories. In some arrangements, an ingredient system may supply beverage ingredients for a greater number of beverages than the number of dispensing heads that are included as part of beverage dispenser 300. In some embodiments, the ingredient system is hidden from by patrons or customers when using dispenser 300. Additionally, in some embodiments, components of the ingredient system may be located remotely from beverage dispenser and piping may connect the beverage dispenser with the remote ingredient system.

In one or more embodiments, the ingredient system may comprise a plurality of highly concentrated ingredients for micro dosing in the preparation of a wide variety of beverages. For example, the ingredient system may be configured to use thirty-six beverage ingredients, such as one or more syrups provided by PepsiCo Inc. to form beverages known under any PepsiCo branded name, such as Pepsi-Cola®. Each beverage ingredient may be stored in a cartridge or storage container.

Additionally, the ingredient system may hold a plurality of sweeteners, such as nutritive sweeteners and non-nutritive sweeteners. Each sweetener may be stored in a cartridge or storage container. Sweeteners and ingredients may be transferred throughout the ingredient system or beverage dispenser using pumps and input/output pump lines. For example, a pump may pump a nutritive sweetener through piping to a dispensing head of the beverage dispenser 300, and another pump may do the same for a non-nutritive sweetener. Other pumps may be used to pump beverage ingredients or water through piping to a dispensing head of the beverage dispenser 300. Another pump or pumps may be used to pump ice to a dispensing head of the beverage dispenser 300. The beverage dispenser may include an ice machine.

In one or more arrangements, a beverage dispenser may comprise a water treatment system, which may be used to treat water. For example, a water treatment system (not shown) may be used to cool water to a desired temperature for a cold beverage. A second water treatment system (not shown) may be used to heat water to desired temperature for hot beverages. A water treatment system may be any suitable water treatment system that improves taste, reduces odors, or reduces chlorines, such as a system that improves water quality (e.g., via reverse osmosis).

The beverage dispenser 300 may be configured to combine the ingredients, sweeteners, and water to create a beverage. Dispenser 300 may be configured to mix water and one or more beverage ingredients according to one or more ratios such as about 200:1, or about 75:1, or about 40:1 (e.g., in the form of a flavor or acid), for non-nutritive sweeteners, and about 6:1 for non-nutritive sweeteners. A base beverage may be prepared with about four streams, e.g., water, a sweetener, flavor, and acid. Additional streams may be added to provide top notes, such as cherry or vanilla flavor, or sweetener blends to reduce calories.

The beverage dispenser 300 may comprise one or more mixing chambers (not shown). Beverage ingredients may be supplied to mixing chambers from their respective containers. For example, syrup and other beverage ingredients may be pumped from their respective containers by pumps to mixing chambers as desired. These pumps may be driven by $CO_2$ from a tank and supplied through a $CO_2$, gas branch line. These pumps may comprise conventional syrup pumps, e.g., BIP pumps. Inlets to a mixing chamber may comprise a water supply line, a sweetener supply line, an acid supply line, and a flavor supply line. The sweetener, acid, and flavor ingredients supplied to mixing chamber may be highly concentrated amounts of those ingredients that have been mixed with water prior to being supplied to the mixing chamber, e.g., a ratio of beverage ingredient to water of about 200 to 1 by weight. After being mixed with water from water supply line, the mixture exiting a mixing chamber may have a lesser ratio of beverage ingredient to water (e.g., 1 to 5 by weight).

The beverage dispenser 300 may comprise a doser unit that includes a dispenser head. A doser unit may receive liquid under pressure and dose appropriately to provide a desired beverage. The dosing of a beverage ingredient may be between about 0.1 cc up to about 0.1 cc to about 17 cc. In one embodiment, dosing may be about 0.5 cc to 17 cc for nutritive sweetener. In some arrangements, dosing may be performed by a sliding vane pump, or other suitable positive displacement pump, gear pump piston pump, oscillating pump, or diaphragm pump. The pump may be controlled through, pulse width modulation, stroked or stepped to deliver the appropriate volume of an ingredient to form a beverage. Those of skill in the art will recognize that control of delivery may be achieved through use of an intelligent device, such as a computer or purpose embedded electronics. In one or more embodiments, a doser unit may comprise an ice hopper.

As shown in the blow-up view of a portion of dispenser head 301 in FIG. 3, a micro bundle may be used to dispense the selected beverage from the beverage dispenser 300. In the embodiment depicted, micro bundle 301 comprises an ice line 380, nine carbonated water lines 304-320, nine non-carbonated water lines 321-337 (including one that may be re-circulated or created on demand, e.g., from the cold water circuit), eighteen flavor lines 338-355, eighteen acid lines 356-373, a nutritive sweetener line 376, and a non-nutritive sweetener line 378. Micro bundle 301 may comprise any suitable cladding, including slots and piping.

A beverage ingredient, such as a sweetener, may be sent through a micro bundle to get better mixing. For example, in one or more embodiments, instead of using a traditional ⅜" inside diameter (ID) or ¼" ID pipe wherein a sweetener may be dropped to the bottom of a cup and a consumer may not taste the sweetener when drinking a top portion of the beverage in a cup, smaller microtubes may be used to get better mixing and have multiple dispense points, and allow for greater dispersion throughout the beverage.

The beverage dispenser 300 may comprise not only a central acid and flavor system, but also a local dairy and/or juice system. In such embodiments, a beverage may be prepared with a shot of juice, e.g., a cola with a shot of lemon juice and/or lime juice. A beverage, such as a cool frappuccino or hot coffee, may be prepared with a shot of a dairy product, e.g., milk or cream.

The beverage dispenser 300 may comprise auto sanitizing systems. The sanitizing system may include a sanitizer cartridge, such as a sanitizer cartridge replacing an ingredient cartridge. When sanitizing, one or more components of the system may be locked so that a sanitizing cycle may be run without interruption. For example, a lock out feature with cartridge recognition of the sanitizer may be provided to prevent unintentional beverage dispensing. The lock out feature with cartridge recognition of the sanitizer may have mechanical and electrical safety redundancy.

Additionally, in some embodiments, the beverage dispenser 300 may include fast fill systems, such as a fast fill system that allows for fast fill from the bottom of a cup.

The beverage dispenser 300 can be configured to perform various functions related to the dispensing of beverages. For example, the beverage dispenser 300 may be configured to receive money from a user, recognize the value paid for a beverage, and return any remainder from the value paid from the price of the dispensed beverage. Additionally, the beverage dispenser 300 may be configured to provide variable pricing based on drink brands, drink choice, and cup size. In some embodiments, the beverage dispenser 300 may be configured to issue a cup to a user with a code corresponding to the size and the type of beverage ordered.

To facilitate a user's selection, a dispenser may include a user interface implemented using software, hardware, firmware, or combinations thereof. Information that represents the drinks or beverages available to a user can be provided by display screens that are provided on a touch screen (e.g., touch screen 303 of FIG. 3), an LCD flat panel, or the like.

In general, an interface for display on a touch screen may use various icons, buttons, screen locations, graphics and/or text to provide one or more display screens and, using the touch screen, buttons or other user interface widgets of each display screen may be actuated by a user to cause changes in the displayed interface. Additional or alternative methods of input could be used to cause changes in the displayed user interface, such as, for example, a keyboard, keypad, mouse, electric push buttons, and/or levers. When a button or widget is pressed, the user interface may show highlighting or some other visual indicator with respect to the actuated button/widget.

Figure 4A:
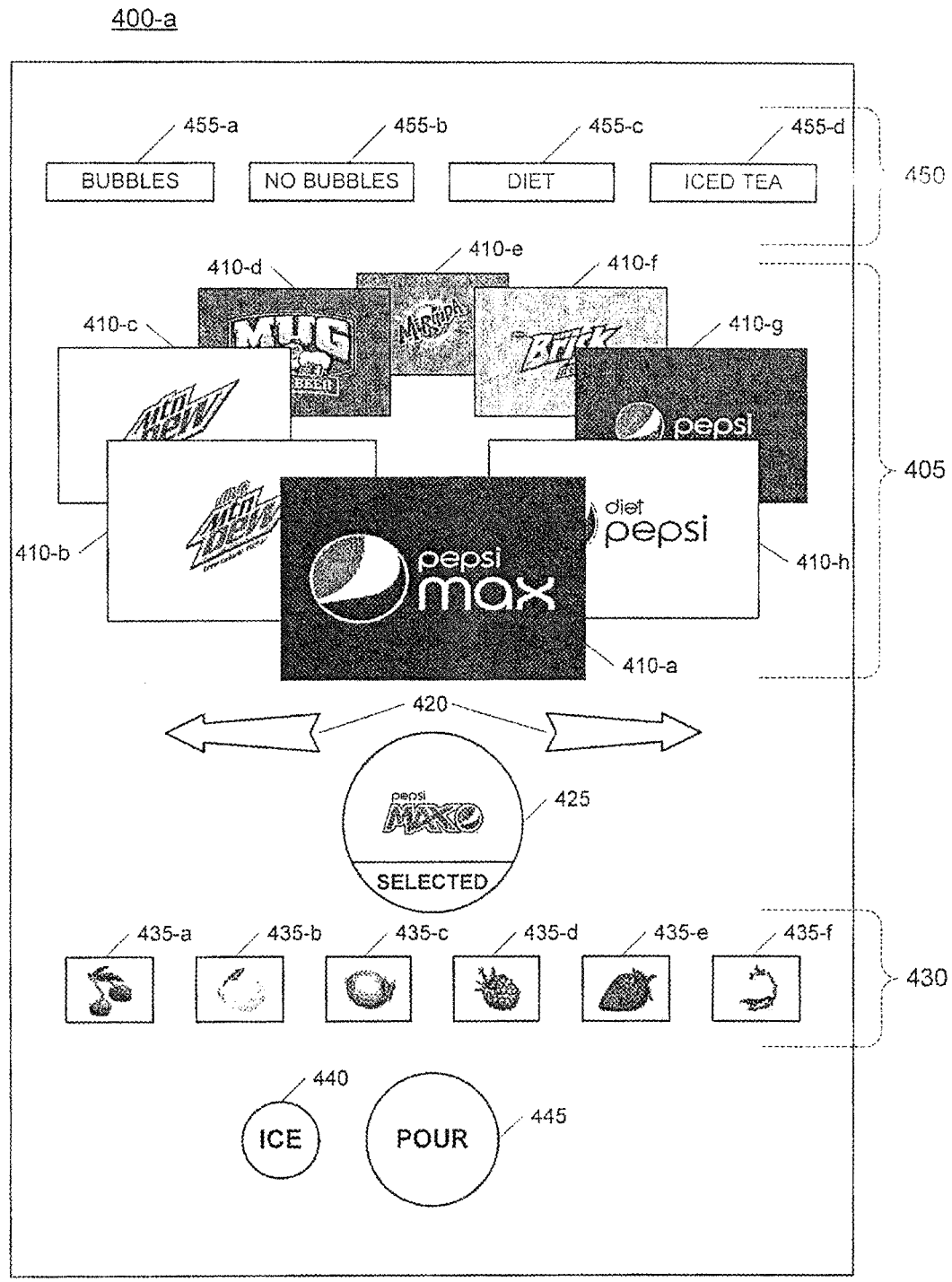
FIGS. 4A-4E illustrate example interface displays according to various aspects described herein.

FIGS. 4A-4E illustrate example user interface displays that can be used as part of an interface. In particular, FIGS. 4A-4E show different display screens for an example embodiment of an interface for a beverage dispensing system. As will be more fully discussed below, a user may progress down a display screen, such as display screen 400-*a* of FIG. 4A, to make desired selections, such as selections of a desired brand of beverage and one or more flavorings that can be used as ingredients to the custom beverage. A display screen, such as display screen 400-*a* of FIG. 4A, may present all information required to select and dispense a custom beverage to a user simultaneously. As illustrated in FIG. 4A, icons for each type or brand of beverage that is available at the dispenser may be displayed at screen region 405. The icons may be arranged such that each icon is placed in a rotating carousel or other rotating pattern. For example, as illustrated by display screen 400-*a*, an icon for Pepsi Max® may be placed at screen location 410-*a*, an icon for Diet Mountain Dew® may be placed at screen location 410-*b*, an icon for Mountain Dew® may be placed at screen location 410-*c*, an icon for Mug® Root Beer may be placed at screen location 410-*d*, an icon for Mirinda® may be placed at screen location 410-*e*, an icon for Lipton Brisk® Iced Tea may be placed at screen location 410-*f*, an icon for Pepsi-Cola® may be placed at screen location 410-*g*, and an icon for Diet Pepsi-Cola® may be placed at screen location 410-*h*.

In one or more embodiments, the icons that form a part of the carousel may be displayed with sizes based on the icons' screen locations. Accordingly, some icons may be displayed with different sizes. For example, as illustrated by display screen 400-*a*, the icon at screen location 410-*e* (e.g., the icon for Mirinda®) may be displayed smaller than the icon at screen location 410-*a* (the icon for Pepsi Max®), etc. Additionally, some icons may be displayed with similar or equal sizes. For example, as illustrated by display screen 400-*a*, the icon at screen location 410-*d* (e.g., the icon for Mug® Root Beer) may be equal to the icon at screen location 410-*f* (e.g., the icon for Brisk® iced Tea), etc.

In some arrangements, the icons that form a part of the carousel may overlap one or more adjacent icons. For example, the icon at screen location 410-*b* (e.g., the icon for Diet Mountain Dew®, as shown in FIG. 4A) may be displayed as being overlapped by the icon at screen location 410-*a* (e.g., the icon for Pepsi Max®, as shown in FIG. 4A) and displayed as overlapping the icon at screen location 410-*c* (e.g., the icon for Mountain Dew®, as shown in FIG. 4A).

Figure 4B:
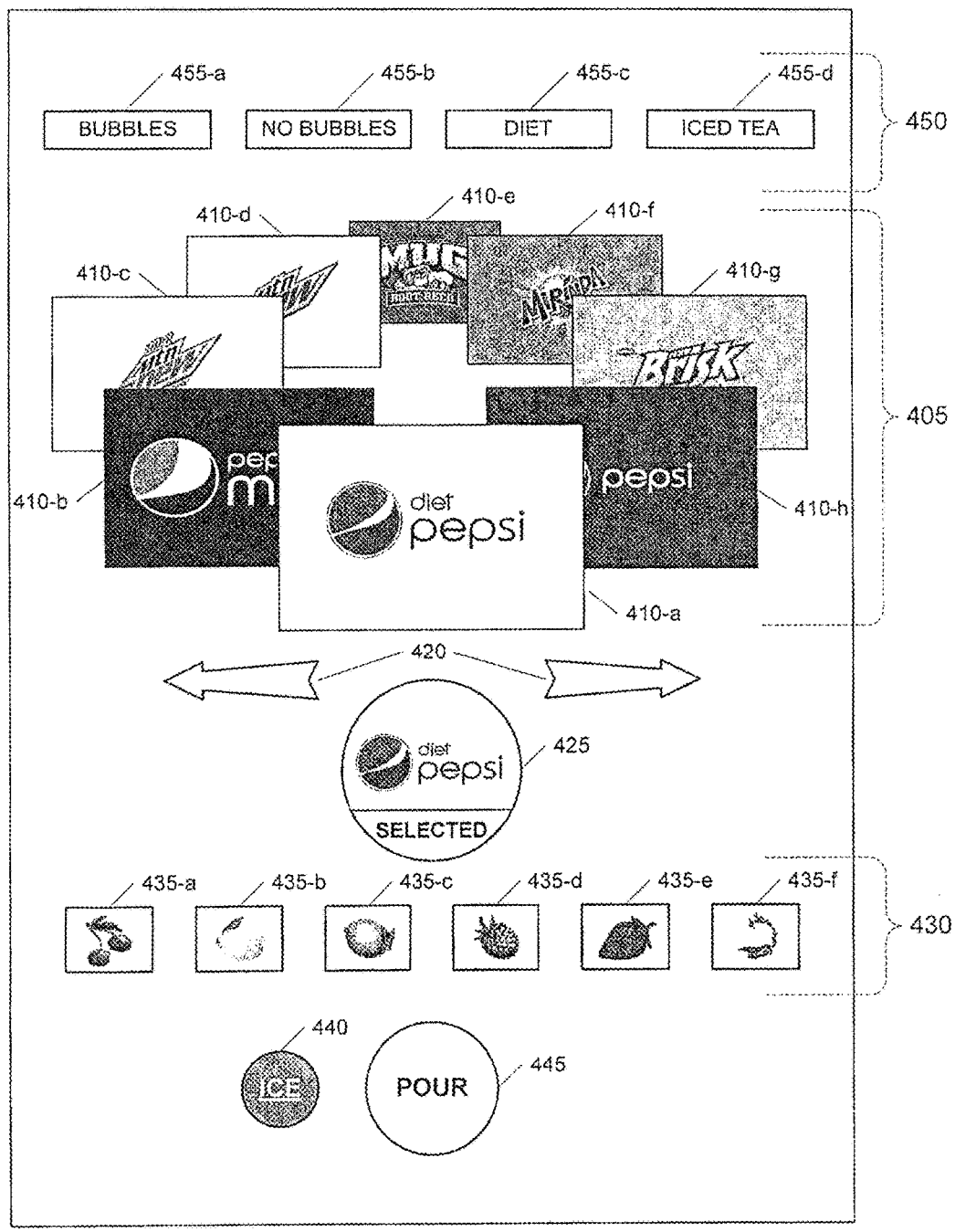

The icons that form a part of the carousel may be simultaneously moved to different screen locations to provide an appearance that the carousel has rotated. For example, the icons of screen region 405 may be moved counter clock-wise and clockwise. For example, turning to FIG. 4B, screen region 405 shows the icons that form a part of the carousel as having been moved one location clockwise with respect to the screen locations illustrated by FIG. 4A. The icon for Diet Pepsi-Cola® that is shown in screen region 405 of FIG. 4B is now displayed as being at the front of the carousel and it may be displayed as the largest icon and it may be displayed unobstructed by other icons.

In some arrangements, there may be an animation that shows each icon moving to its new screen location, such that the icons appear to slide across the screen. In others, each icon may simply disappear (or fade out) from the old screen locations and appear (or fade in) at the new screen locations.

A user may interact with the user interface to initiate the movement of the carousel in various ways. In some arrangements, a user may actuate a scroll button (e.g., via arrows 420) to cause the carousel to rotate in a particular direction.

The icons for the types or brands of beverages available in the dispenser (e.g., the icons shown at region 405 of FIGS. 4A-4E) may be displayed such that, when selected, the selected icon is moved to the front of the carousel. For example, with respect to display screens 400-a through 400-e of FIGS. 4A-4E, a user may actuate one of the icons of region 405 to cause the carousel to rotate until the actuated icon is at the front of the carousel. In one example, a user could actuate the icon for Mountain Dew® to cause the carousel shown at region 405 of FIG. 4A to change to the carousel shown at region 405 of FIG. 4C. In some arrangements, the direction the carousel rotates may be dependent on the distance to the front of the carousel. In one example, with respect to FIG. 4A, pressing the icon for Mountain Dew® at screen location 410-c may cause the carousel to rotate counter-clockwise until the icon for Mountain Dew® is at the front of the carousel (e.g., at screen location 410-a). Pressing the icon for Lipton Brisk® Iced Tea at screen location 410-f may cause the carousel to rotate clockwise until the icon for Lipton Brisk® Iced Tea is at the front of the carousel (e.g., at screen location 410-a). In other arrangements, the carousel may always rotate in a single direction upon actuation of an icon of region 405 (e.g., always rotate clockwise).

Figure 4C:
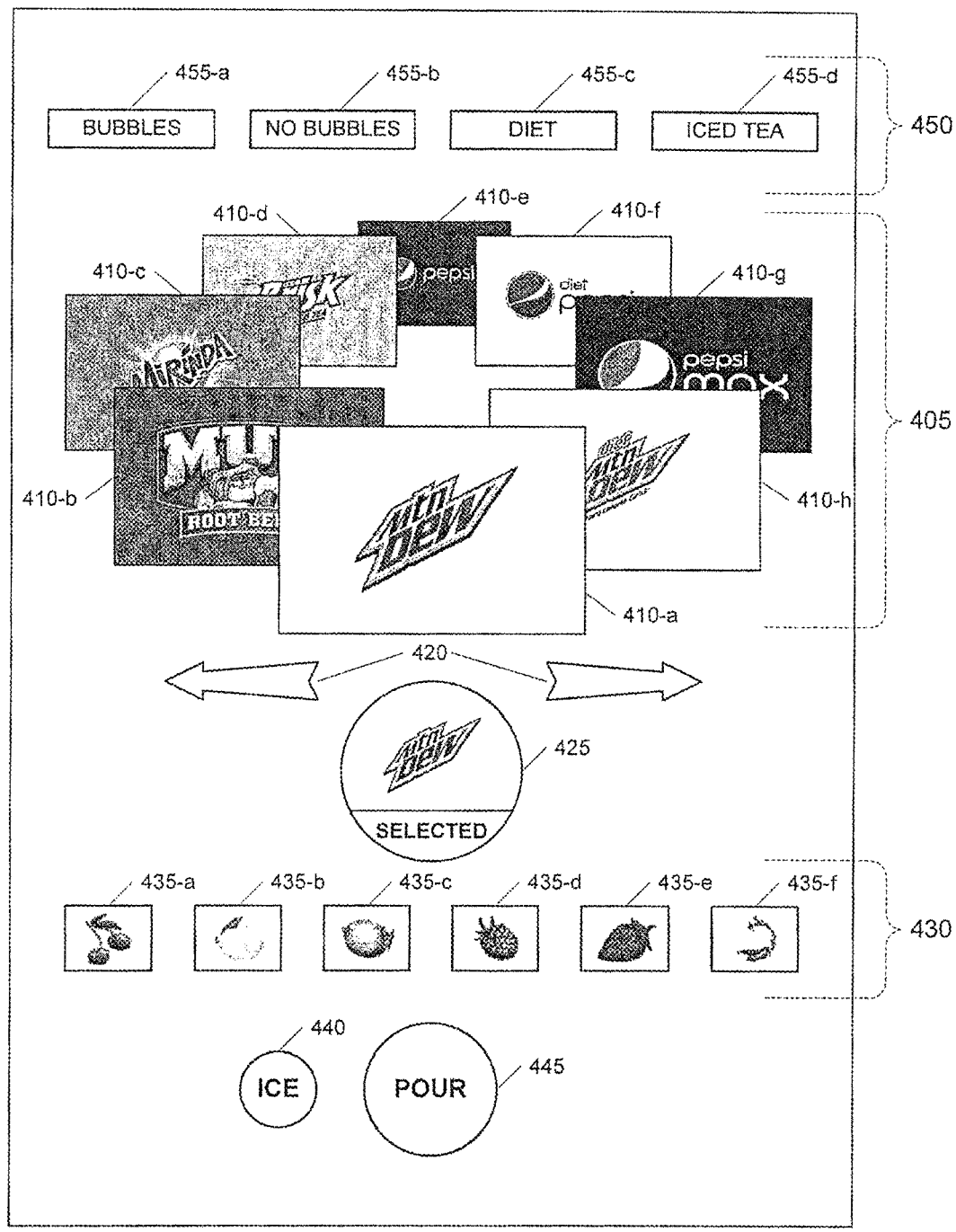
Figure 4D:
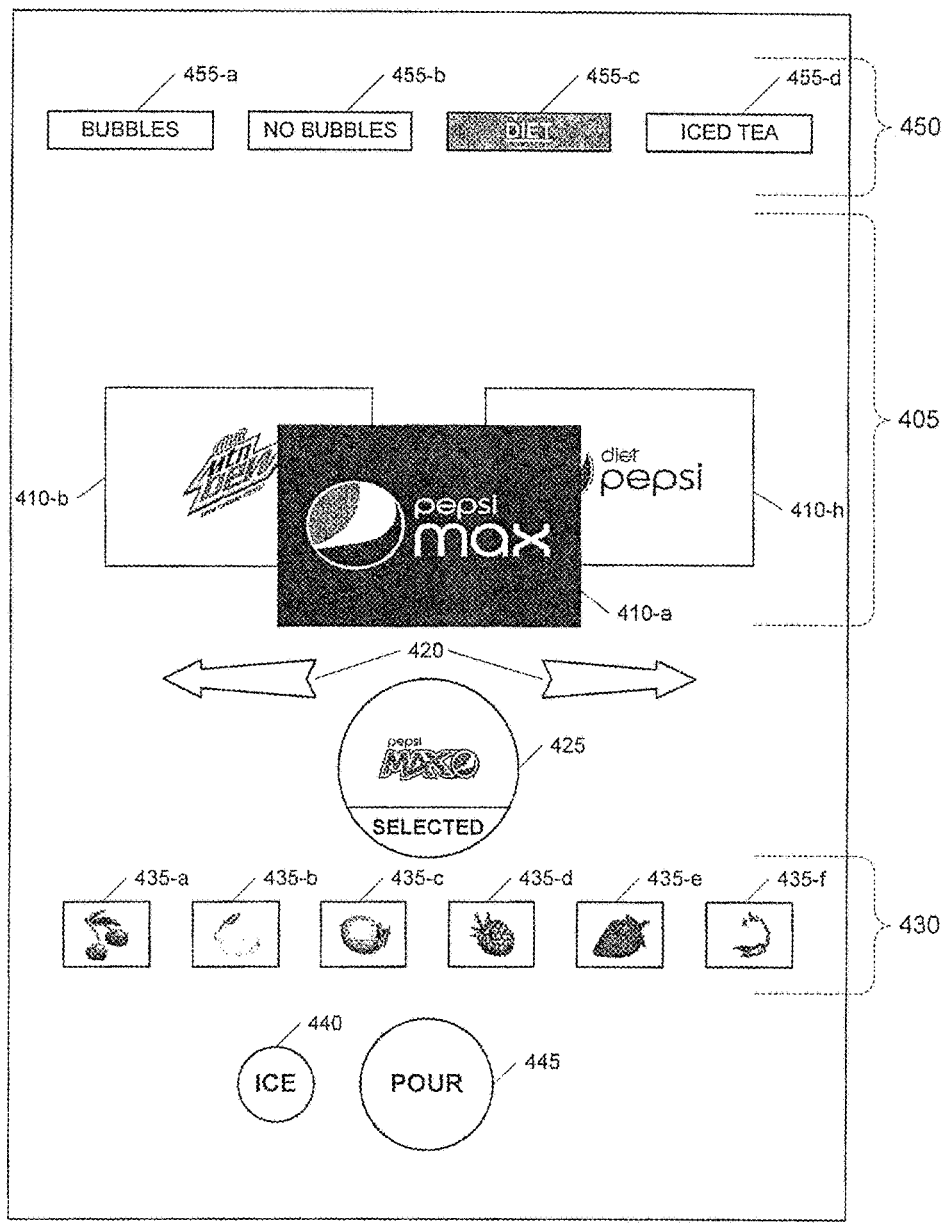

In some arrangements, a user may actuate one or more buttons that describe a desired property for the visible brands of beverages. For example, as shown in FIG. 4D, region 450 may include a button 455-a that, when actuated, causes the carousel to display only brands of beverages that have bubbles; a button 455-b that, when actuated, causes the carousel to display only icons for beverages that have no bubbles; a button 455-c that, when actuated, causes the carousel to display only brands of beverages that are diet; and a button 455-d that, when actuated, causes the carousel to display only brands of beverages that include iced tea. In FIG. 4D, button 455-c has been selected and the carousel of region 405 may include only diet beverages. In some arrangements buttons 455-a, 455-b, 455-c and 455-d can be implemented as toggle buttons. When a toggle button is not highlighted (e.g., button 455-a of FIG. 4A) the toggle button would not affect what icons are displayed at the carousel of region 405 (e.g., all available brands are displayed in region 405 of FIG. 4A). When a toggle button is highlighted (e.g., button 455-c of FIG. 4D) the toggle button may affect what icons are displayed in the carousel of region 405.

In some embodiments, the dispenser may receive user preference information to change the visibility of the icons. For example, the user may insert or swipe a memory card or RFID card at the dispenser. The dispenser could read preference information, such as a past purchase history for the user or user-preferred types or brands of beverages, and the visibility of the icons could be changed based on the preference information. For example, the types or brands of available beverages could be compared to the user preference information, and if a match is found (e.g., the user preference information includes an identification of Pepsi Max®), the icon for the matching beverage may be shown prominently in the carousel. Any type or brand of available beverages that does not have a match in the user preference information could be made invisible.

Other methods of transmitting user preference information to the dispenser could be used. For example, the user could transmit user preference information via Bluetooth® from a mobile device to the dispenser to customize the displayed user interface. Additionally, a cup bearing an RFID identifier may be prepared and made available to the user. The RFID identifier may include information identifying a particular brand of beverage, and the interface could be changed to display only that particular brand of beverage in the carousel.

As shown in FIG. 4A, the selected type or brand of beverage may be shown at location 425. The selected type or brand may be changed by the user. For example, as shown in FIG. 4A, location 425 shows that Pepsi Max® has been selected.

In some arrangements, the interface may automatically choose the selected brand based on user interactions with the interface. For example, as shown in FIG. 4A, the user can select the icon for Mountain Dew® and the interface can cause that brand to be the selected brand of beverage, among other changes (e.g., rotating the carousel such that the icon for Mountain Dew® is at the front of the carousel and displaying Mountain Dew® as the brand in location 425, as shown in FIG. 4C).

In one or more embodiments, the interface may change the selected brand only upon a designated user input. For example, a brand may be selected only when it is at the front of the carousel. In FIG. 4A, for example, Pepsi Max® could be made the selected brand upon a user selecting the icon for Pepsi Max®, because it is at the front of the carousel. Selecting another icon of region 405 of FIG. 4A may only cause the carousel to change such that the actuated icon is moved to the front of the carousel. Thus, in some instances, the brand of beverage at the front of the carousel could be different than the brand displayed in location 425.

In some embodiments, the user may be able to select one or more modifiers that can be dispensed with the selected type or brand of beverage. Modifiers may include additives or flavorings for a beverage. For example, as shown in FIGS, 4A-4E, region 430 may include a modifier button 435-a that, when selected, causes the dispenser to select cherry flavoring; a modifier button 435-b that, when selected, causes the dispenser to select lemon flavoring; a modifier button 435-c that, when selected, causes the dispenser to select lime flavoring; a modifier button 435-d that, when selected, causes the dispenser to select raspberry flavoring; a modifier button 435-e that, when selected, causes the dispenser to select strawberry flavoring; and a modifier button 435-f that, when selected, causes the dispenser to select vanilla flavoring. Multiple flavorings may be simultaneously selected in some variations.

In some embodiments, the visibility of the icons in region 430 may change based on various states of the user interface. For example, the visibility of the icons of region 430 may change based on user preference information read from a memory card supplied by a user (e.g., a card inserted or swiped into the dispenser that includes information identifying one or more flavorings to display to the user), information transmitted by a user to the dispenser (e.g., transmitted information identifying one or more flavorings to display via a Bluetooth connection from a mobile phone), information transmitted via an RFID tag (e.g., a RFID tag that includes information identifying one or more flavorings to display to the user), or the like.

In one or more arrangements, the user may interact with the interface to choose whether to dispense ice. As shown in FIGS. 4A-4E, the user may select an ice button 440 that, when actuated, causes the dispenser to dispense ice. When the machine is dispensing ice and/or when the ice button 440 is actuated, the ice button 440 may be highlighted (e.g., as shown in FIG. 4B).

In some arrangements, the interface may include other icons, buttons, graphics, widgets or text, such as, for example, for selecting an amount of flavoring or additive to add to the custom beverage; for selecting an amount of the selected brand to add to the custom beverage; for selecting a total amount of the custom beverage (e.g., via a selected cup size and/or number of ounces); or advertisements.

Figure 4E:
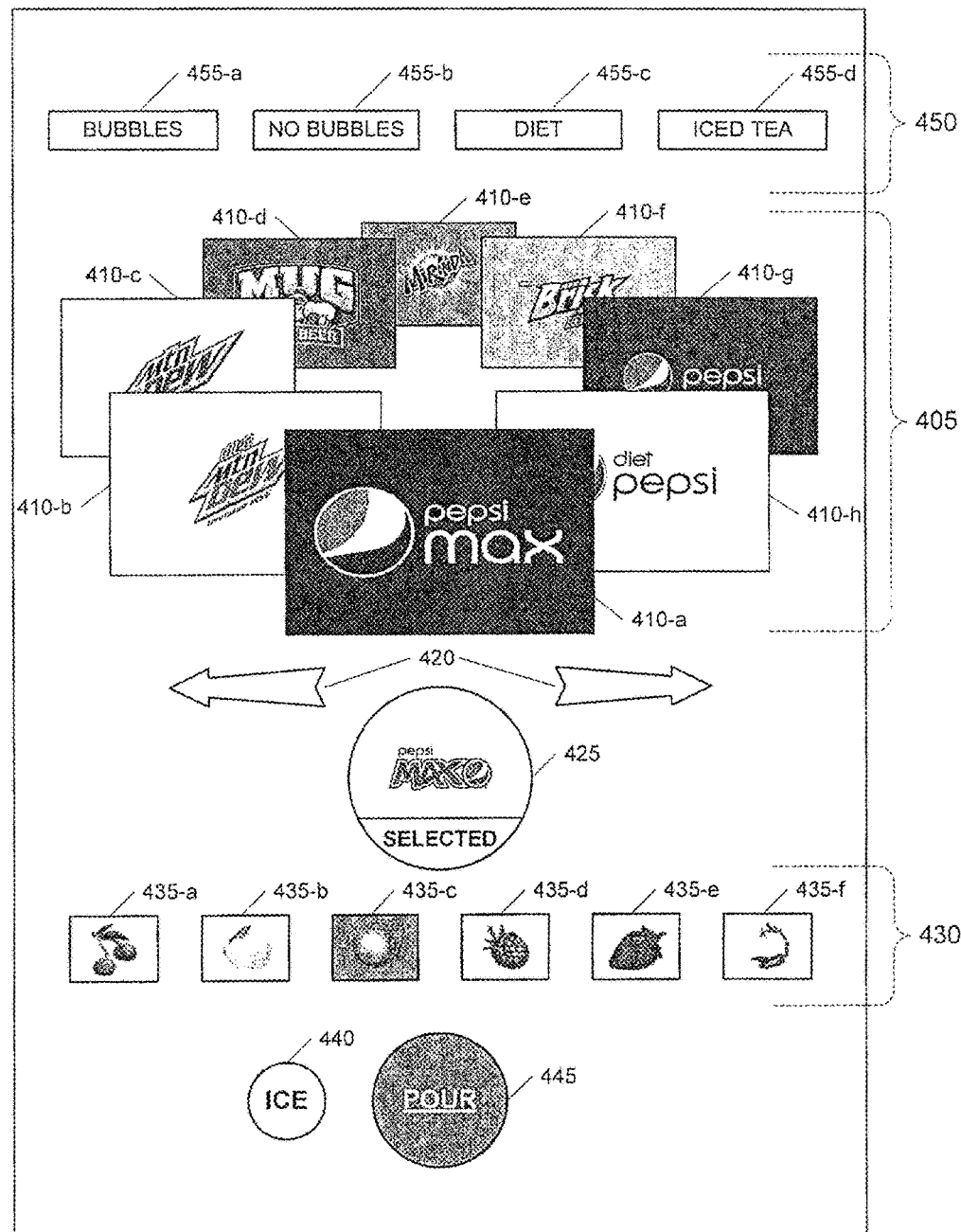

In some embodiments, the user may choose whether to dispense a beverage according to the dispenser's current settings. For example, a user may select pour button 445 that, when selected, causes the dispenser to dispense a beverage or a combination of a selected brand of beverage and one or more selected additives or flavorings. As an example, pour button 445 may be actuated and Mountain Dew® could be dispensed because Mountain Dew® is the selected brand (as shown by location 425 of FIG. 4C). As another example, as shown in FIG. 4E, pour button 445 may be actuated and Pepsi Max® could be dispensed in combination with lime flavoring because Pepsi Max® is the selected brand and lime flavoring is selected. In some arrangements, the dispenser may dispense a beverage for as long as the pour button 445 remains actuated.

In some variations, a user may be able to select multiple types or brands of beverages. For example, a user may select the icon for Pepsi Max® and the icon for Mountain Dew® and then may select pour button 445. As a response, the dispenser may dispense a mixture of Pepsi Max® and Mountain Dew®.

Figure 5A:
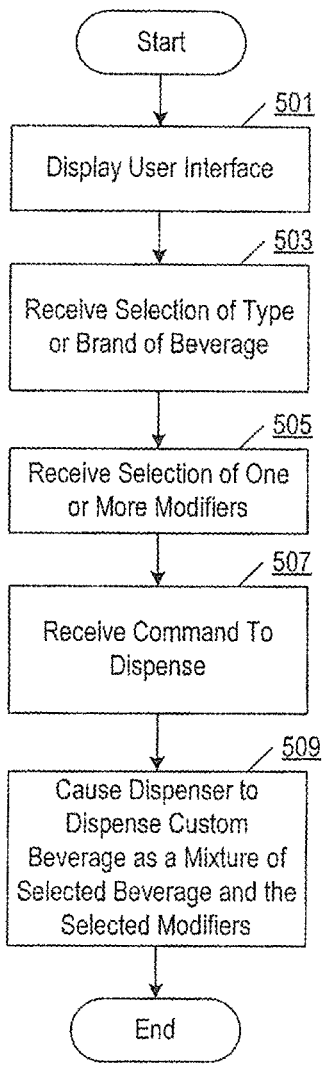
FIG. 5A illustrates an example method for dispensing an available product according to one or more aspects described herein.

The manner in which a user interacts with the interface of the dispenser to select and/or dispense a beverage can vary. FIG. 5A illustrates an example method for dispensing an available product according to one or more variation.

At step 501, a user interface may be displayed on a display device of the dispenser. This may include displaying an initial display screen (e.g., display screen 400-a of FIG. 4A) on the display device (e.g., touch screen 303 of FIG. 3).

At step 503, a selection of a type or brand of beverage may be received via input from the user. For example, a user may select Mountain Dew® by selecting the icon having the Mountain Dew® logo. The user may scroll through the different brands that are available (e.g., via display buttons 420 of FIGS. 4A-4E) until Mountain Dew® is selected.

At step 505, a selection of one or more modifiers to a beverage may be received via input from the user. For example, a user may select lime flavoring by pressing a button having a lime graphic (e.g., button 435-c of FIG. 4A). In response, the interface may highlight the button to indicate that lime flavoring is selected and can be added when creating the custom beverage (e.g., as seen in display screen 400-e of FIG. 4E). If desired, additional selections of other modifiers can be made by the user (e.g., the additives/flavorings represented by modifier buttons 435-a, 435-b, 435-d, 435-e and/or 435-f of FIGS. 4A-4E).

At step 507, a command to dispense the custom beverage may be received via input from the user. For example, a user may have selected Pepsi Max® and lime flavoring (e.g., as shown by location 425 of FIG. 4E and modifier button 435-c of FIG. 4E), and the user may press pour button 445.

At step 509, the interface can cause the dispenser to dispense the custom beverage as a mixture of the type or brand of beverage selected at step 503 and the one or more modifiers selected at step 505. For example, as a response to the actuation of the pour button 445 of step 507, the interface may highlight pour button 445 (e.g., as shown in display screen 400-e of FIG. 4E) and cause the dispenser to dispense a mixture of Pepsi Max® and lime flavoring.

Although the example method of FIG. 5 shows a particular order of steps, the exact order of the above steps could change (e.g., step 505 could occur prior to step 503), and the dispenser could receive additional input from the user before, after, and in between particular steps of the above example method (e.g., receive an actuation of one of scroll buttons 420, receive an actuation of the ice button 440, receive an actuation of one or more of buttons 455-a through 455-d, receive an actuation of a button allowing a user to select a desired amount of carbonation). The order of the steps and/or what input is received during the course of a user's interaction with a dispenser may be dependent on the organization of the user interface.

In some arrangements, the user interface may be organized to facilitate the manner in which a user makes selections for a desired beverage. The user interface may be generally organized in a top down manner so that the user can start at the top of a display screen (e.g., display screen 400-a of FIG. 4A) and make selections by moving down the interface (e.g., selecting a desired property for a desired brand of beverage at region 450 of FIG. 4A, traverse down the display screen to region 405, selecting a brand of beverage at region 405 of FIG. 4A, traverse down the display screen to region 430, and selecting one or more modifiers for adding to the selected brand at region 430). For example, the carousel region 405 may be located above region 430, which includes the modifiers for the beverage. Such a placement may be implemented because a user could be more likely to select the brand of beverage prior to any additive or flavoring to be added to the beverage. Pour button 445 may be located near the bottom because a user may be more likely to begin dispensing the custom beverage after selecting the additives/flavorings. Similarly, buttons in region 450 may be located above the carousel because a user may be more likely to actuate such buttons prior to making a selection of a desired brand of beverage. Ice button 440 may be placed near pour button 445 because a user may be more likely to put ice in their cup just prior to dispensing the custom beverage.

FIG. 5B illustrates an example of the progression of a user when using an interface to select and dispense a desired product. At step 511, a user may begin at the top of display screen 550 to view the available brands and may select a desired brand of beverage (e.g., via an interaction with the carousel of region 405 and/or an interaction with scroll buttons 420, etc.). In some instances, a user may begin at region 450 and may select a desired property for the desired brand of beverage (e.g., via an interaction with the buttons of region 450) and then proceed down to region 405. The user's selection of a brand of beverage at step 511 can be used as the input for step 503 of FIG. 5A. As the user progresses down the user interface's display screen, the user may confirm the desired beverage is selected by viewing location 425. Continuing the user's progression down the interface display, at step 513 of FIG. 5B, the user can view the available modifiers by viewing modifier buttons 435-a through 435-f and may make a selection of one or more desired modifiers. The user's selection at step 513 can be used as the input for step 505 of FIG. 5A. The user may confirm that the desired modifiers are selected by confirming whether each of the desired modifiers is highlighted in the display screen 550 (e.g., button 435-*c* for lime flavoring is highlighted in display screen 550). Continuing the user's progression down the interface display, at step 515, the user may press the pour button 445. The user's actuation of pour button 445 may be used as the input for step 507 of FIG. 5A. Finally, below the display screen 550 and upon actuation of pour button 445, at step 517 of FIG. 5B, the dispenser may dispense the custom beverage (e.g., a mixture of Pepsi Max® and lime flavoring), which a user can receive in cup 560.

Further, in some embodiments, the user interface could present all information required to select and dispense a custom beverage to a user simultaneously. For example, with respect to display screens 400-*a* through 400-*e* of FIGS. 4A-4E, the user may be simultaneously presented with the available beverages via the carousel of region 405, which brand of beverage is currently selected via location 425, and which flavoring or additives can be added to create the custom beverage via the buttons 435-*a* through 435-*f* of region 430. In other words, the carousel of region 405, the buttons of region 430, and other items (e.g., buttons of region 450, scroll buttons 420, selected brand widget 425, ice button 440, and/or pour button 445) may always be displayed to a user on a single display screen while the user is interacting with the user interface to select and dispense a custom beverage.

The icons of the carousel may be ordered in the carousel according to various criteria. For example, an operator or supplier of the dispenser may choose the order of the icons in the carousel (e.g., the icon for Pepsi-Cola® is adjacent to Diet Pepsi-Cola®, etc.). Additionally, the icons of the carousel may be selected or ordered based on time of day (or day of the week, etc.). For example, the interface may be coded such that certain brands are located next to each other on the carousel at particular times of the day.

Icons of the carousel may also be ordered based on usage of the dispenser. For example, more popular brands of beverages could be located adjacent to each other, while less popular brands of beverages are located adjacent to each other. In one example, with respect to display screens 400-*a* through 400-*e* of FIGS. 4A-4E, Pepsi Max® may be the brand that is most commonly dispensed from the dispenser, while Diet Mountain Dew® and Diet Pepsi-Cola® are less commonly dispensed than Pepsi Max® but more commonly dispensed than the remaining available brands (e.g., Mountain Dew®, Mug® Root Beer, Mirinda® Lipton Brisk® Iced Tea, and Pepsi-Cola®). Popularity of brands may vary from dispensing machine to another in some variations (e.g., based on a dispenser's historical usage history). Similar criteria-based ordering may be implemented for other regions of the interface, such as the ordering of modifier buttons 435-*a* through 435-*f* of region 430 and/or buttons 455-*a* through 455-*e* of region 450.

The interface may have a default state that provides an initial presentation of information to a user, such as a display screen where the carousel always has a particular brand at the front of the carousel. For example, an operator or supplier of the dispenser may desire to promote a particular brand of beverage (e.g., Pepsi Max®) and, therefore, may arrange the interface such that the particular brand is moved to the front of the carousel when the interface returns to its default state (e.g., when returning to the default state, the interface presents display screen 400-*a* of FIG. 4A). Additionally, the interface may be arranged such that the brand that is moved to the front of the carousel depends on various criteria, such as the criteria mentioned above with respect to the ordering of icons in the carousel (e.g., time of day, usage of the dispenser, etc.). The interface may return to the default state after dispensing of a custom beverage and/or after a threshold amount of idle time.

After the dispenser is in service, an operator or supplier of the dispenser may wish to update or change various components of the dispenser. For example, an operator or supplier of the dispenser may change which brands of beverages or flavorings are available at the dispenser. In some arrangements, the operator or supplier may update the dispenser via a server in communication with the dispenser (e.g., server 100 of FIG. 1).

Figure 6:
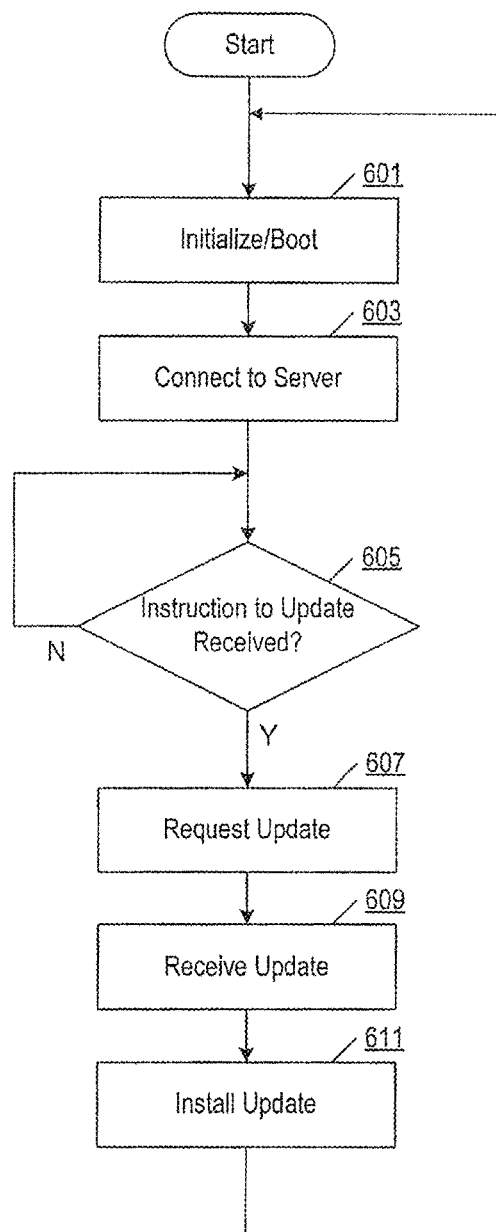
FIG. 6 illustrates an example method for updating a dispensing system according to one or more aspects described herein.

FIG. 6 illustrates an example method for updating a dispensing system according to one or more aspects of the disclosure. At step 601, a computing system of the dispenser may be initialized from an off state to provide a display screen on a display device of the dispenser (e.g., display screen 400-*a* of FIG. 4A onto touch screen 303 of FIG. 3).

At step 603, the computing system of the dispenser may establish a connection with a server (e.g., server 100 of FIG. 1). At step 605, upon establishing a connection with the server, the computing system may wait for an instruction from the server to perform an update. Waiting for an instruction from the server can include periodically determining whether an instruction to update has been received at the computing device. In some arrangements, an instruction to update can include an identification of which update to perform (e.g., a version number for the updated software package, etc.).

At step 607, upon receiving an instruction to update, the computing system of the dispenser may transmit a request to the server that directs the server to being providing the update to the dispenser. In some embodiments, the request may be an acknowledgement of the instruction that was received at step 605. The request could also include an identification of which update the server is to send to the dispenser (e.g., the version number received as part of the instruction to update received at step 605).

At step 609, the computing device of the dispenser may receive the update from the server. The update could be an update to various components of the dispenser. For example, it may be an update to software, firmware or drivers used by the dispenser's computing device. As one example, the update may be an update to recipes used when creating the custom beverage. For example, the update may change the amounts of ingredients (e.g., flavorings, additives, water, syrups, etc.) used when creating the custom beverage. The update may also update the user interface of the dispenser. For example, it could change what types or brands of beverages are available at the dispenser and/or the types of additives or flavorings that are available. The update may also change the appearance of the user interface such as, for example, by modifying the amount of overlap between adjacent icons of the carousel; modifying where icons that form a part of carousel are placed in the display screen; modifying the order in which icons are displayed; updating graphics and/or text used by the user interface, and the like.

At step 611, the computing device may install the update received at step 609. Upon installation, the computing device may perform a reset or otherwise proceed back to step 601 for re-initialization.

Figure 7A:
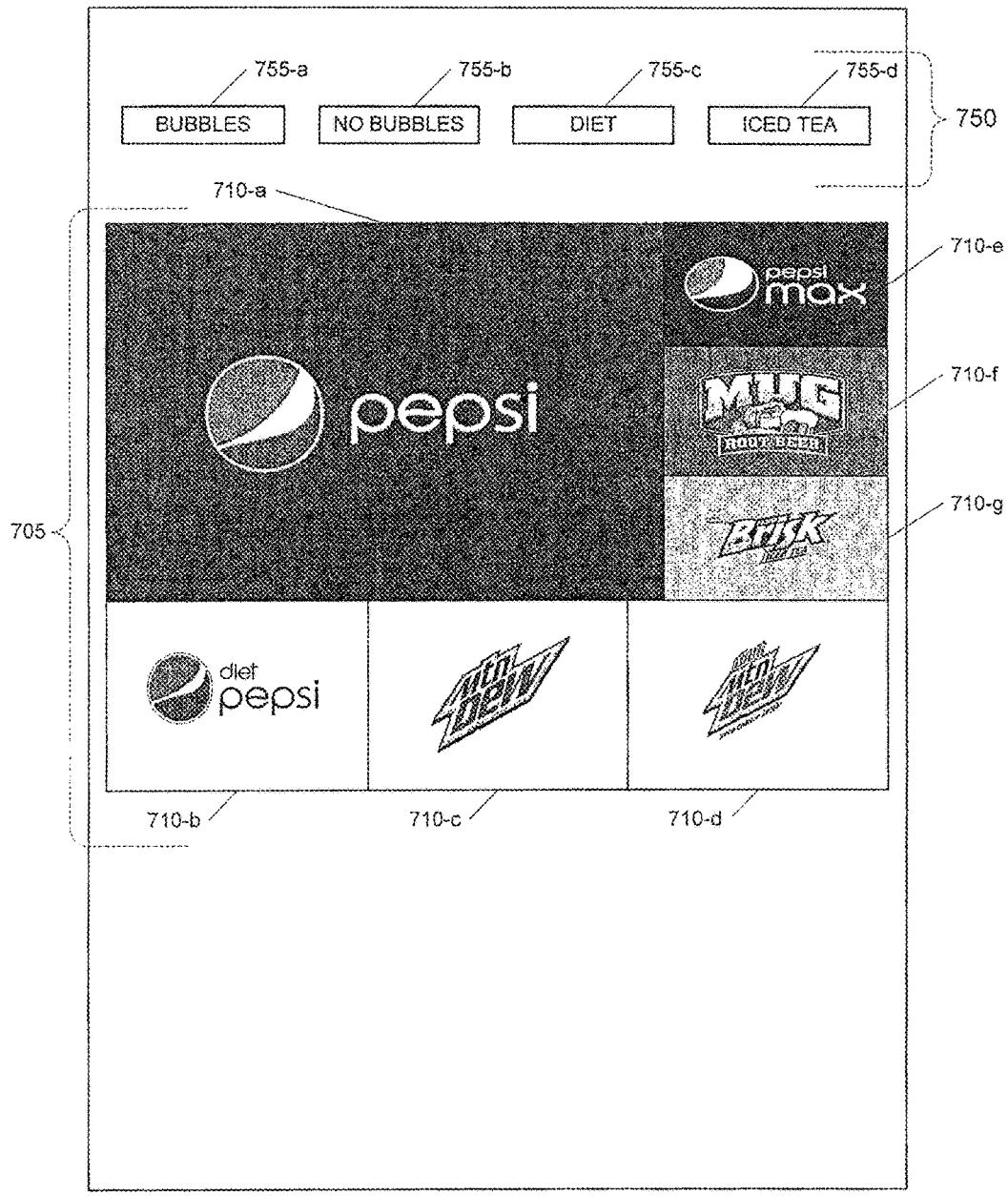
FIGS. 7A-7E illustrate example interface displays for other embodiments according to various aspects described herein.
Figure 7B:
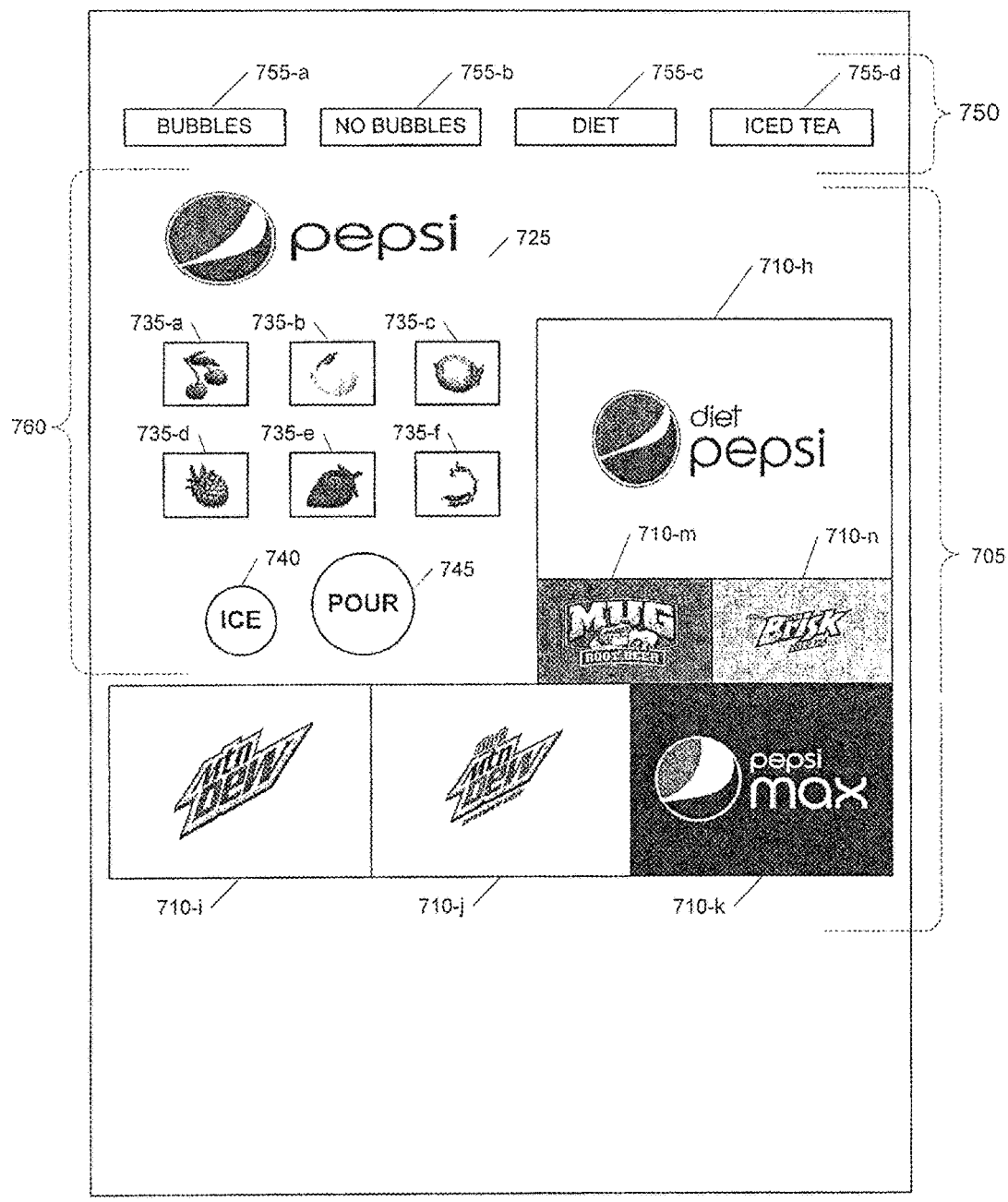
Figure 7C:
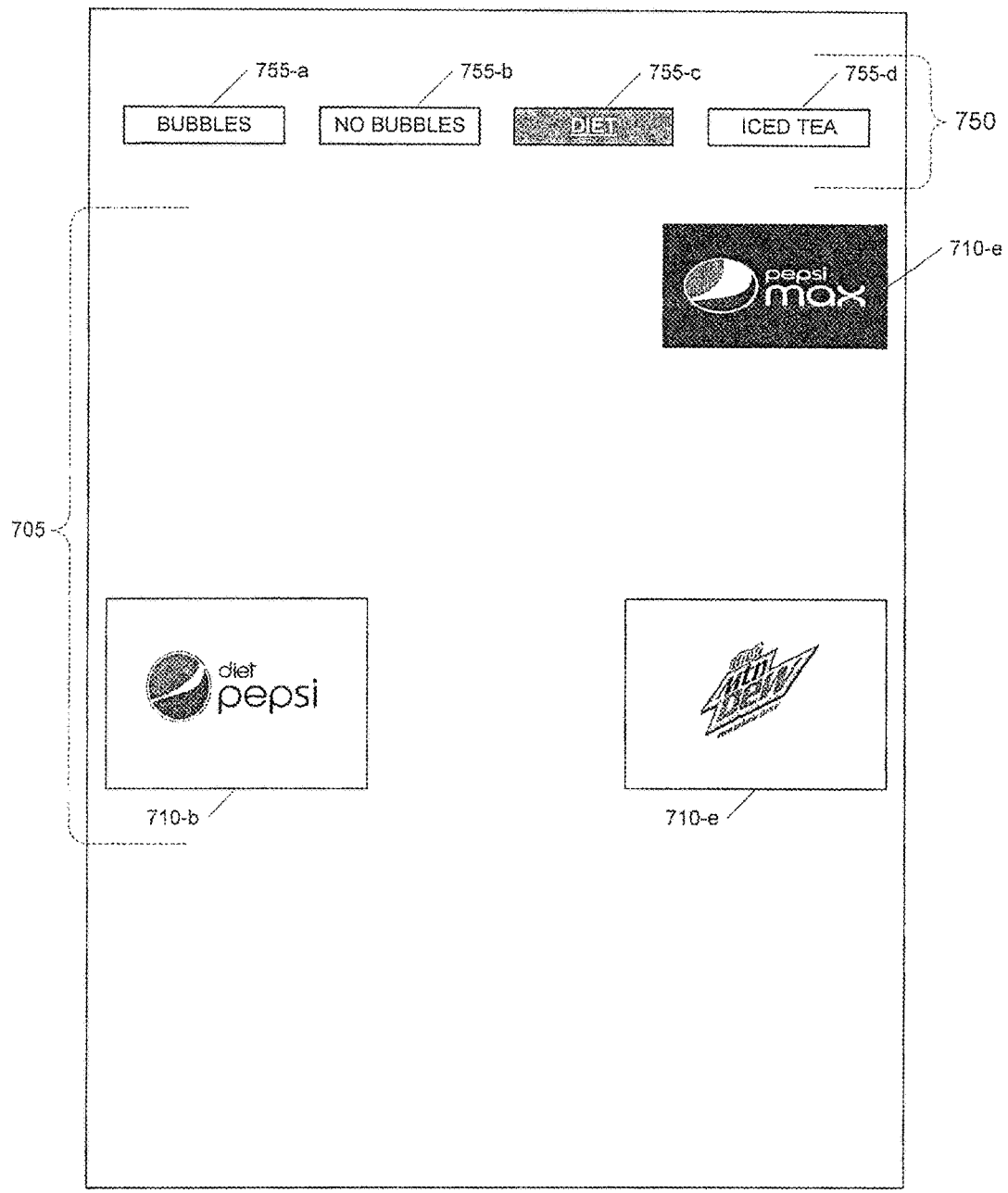

Although the above discussion describes various embodiments of a user interface that are suitable for allowing a user to select and dispense a beverage from a dispenser, other embodiments may be used that share one or more variations. For example, FIGS. 7A-7E illustrate example interface displays for other embodiments including an alternative to the carousel display of FIGS. 4A-4E. In some arrangements, FIG. 7A shows a display screen 700-a initially displayed to a user. The other display screens (e.g., 700-b, 700-c, 700-d, and 700-e) of FIGS. 7B-7E may be displayed to a user based on various inputs received from the user while the user interacts with the dispenser.

As illustrated in FIG. 7A, icons for the types or brands of available beverages may be displayed in a matrix format at region 705. The matrix format of region 705 can be defined by the placement, size and/or order of the icons forming the matrix. For example, icons for the different types or brands of available beverages may be placed at screen locations 710-a, 710-b, 710-c, 710d, 710-e, 710-f and 710-g. The placement, size and order of the icons of the matrix format may be determined similarly to the methods described above with respect to the icons of the carousel of FIGS. 4A-4E. For example, a user could actuate button 755-a, 755-b, 755-c, 755-d of region 750 to change the icons that are visible in region 705. A user may actuate button 755-c and only diet beverages may be displayed in region 705, as shown by display screen 700-c of FIG. 4C.

The icons of region 705 may be implemented as selectable icons that, when actuated, cause a new display screen to be presented. For example, if the user actuates the icon for Pepsi-Cola®, a display screen such as 700-b of FIG. 7B may be displayed. Display screen 700-b may include region 760 that includes a display icon 725 for the currently selected brand of beverage; various buttons representing the modifiers (e.g., additives or flavorings) that are available, such as modifier buttons 735-a, 735-b, 735-c, 735-d, 735-e and 735-f; an ice dispenser button 740; and a pour button 745.

Figure 7D:
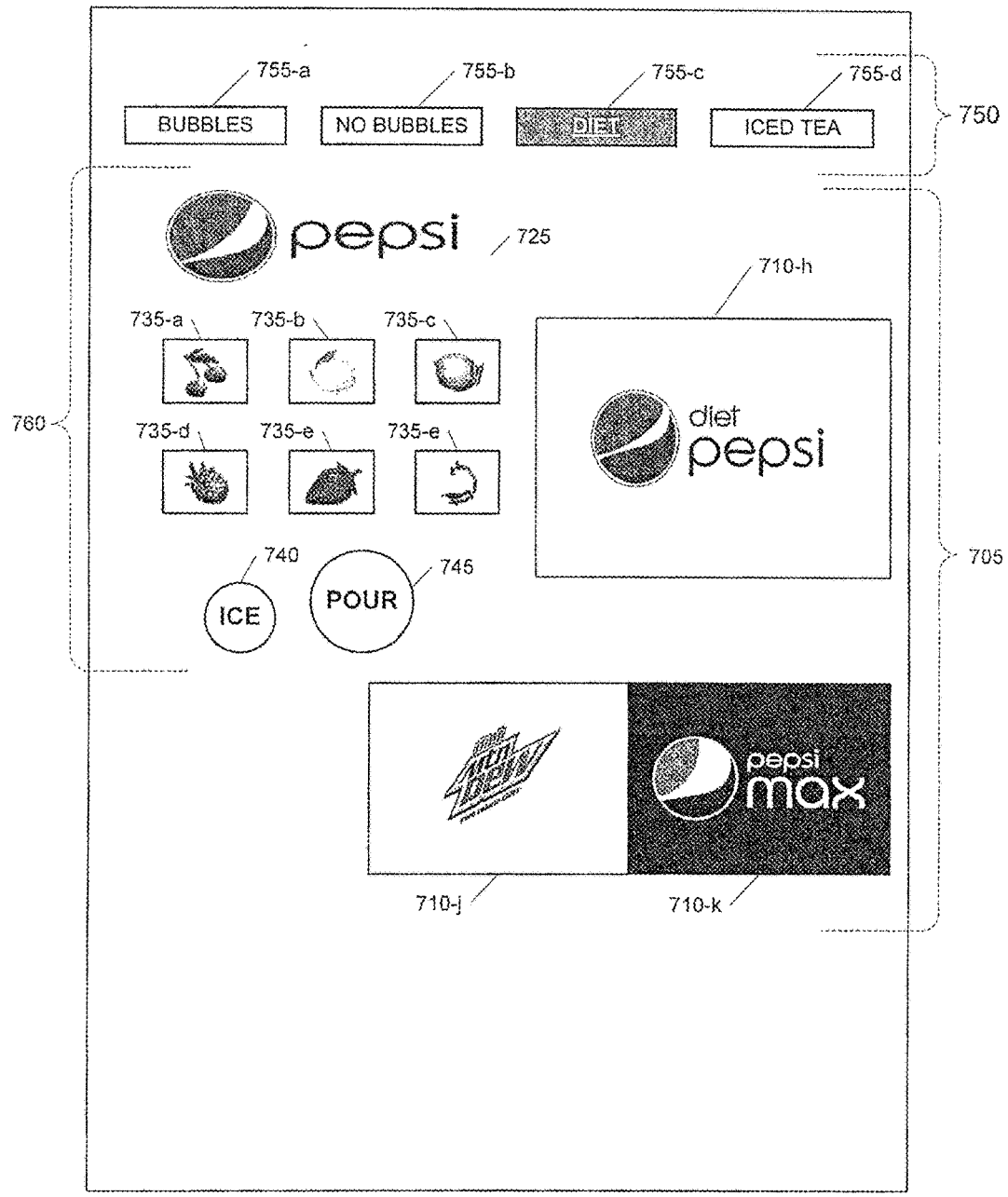
Figure 7E:
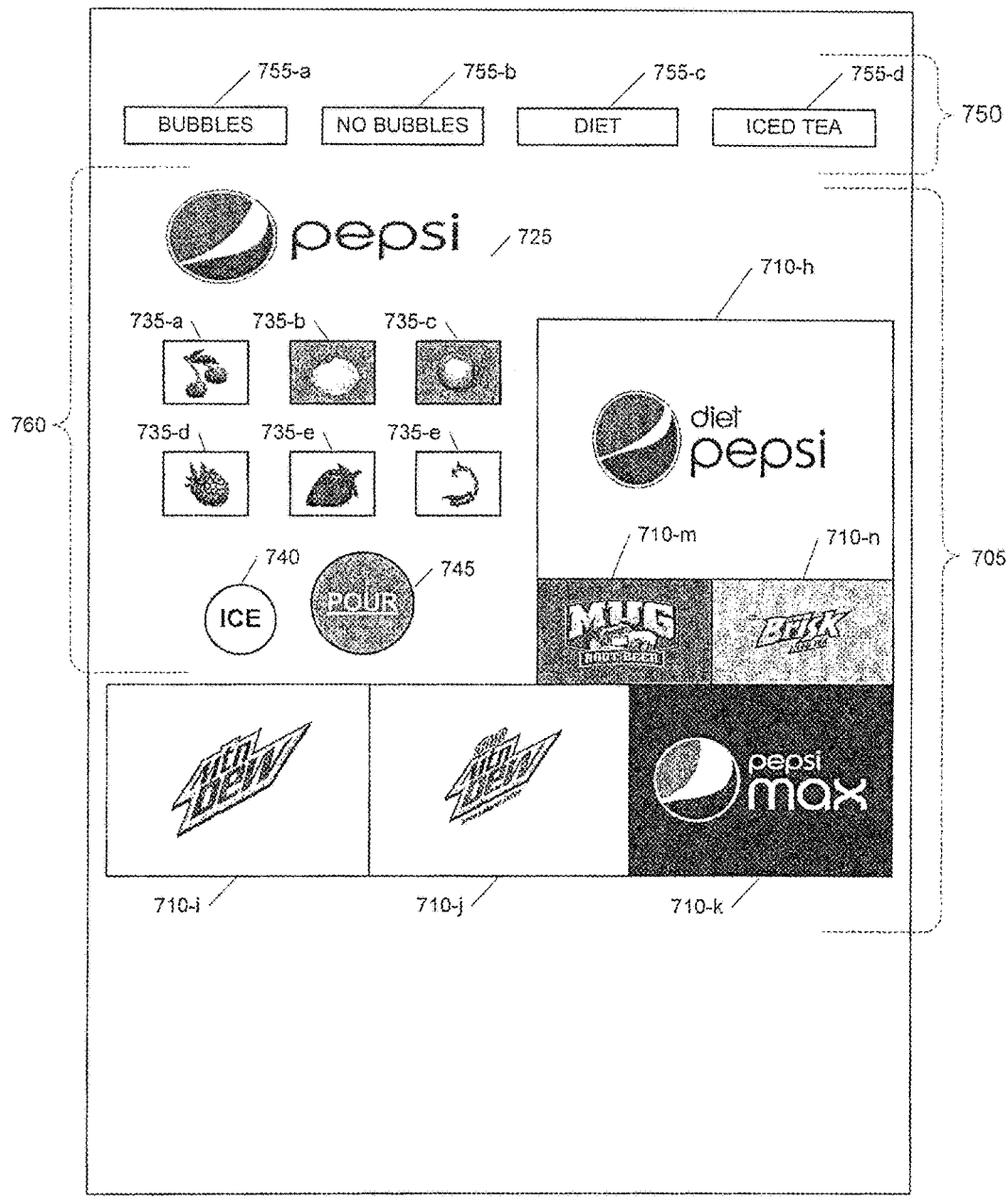

As illustrated in FIGS. 7A-7E, the organization of the matrix format may change dependent on whether there is a current brand selected. For example, the layout of the matrix format at region 705 may change such that icons are placed at screen locations 710-h, 710-i, 710-j, 710-k, 710-m and 710-n when a brand of beverage is selected by the user. Buttons 755-a, 755-b, 755-c and 755-d of region 750 may be actuated to change what is visible in the matrix format of region 705 when a brand of beverage is selected, such as illustrated by FIG. 7D.

The invention herein has been described and illustrated with reference to the embodiments of the figures, but it should be understood that the features of the invention are susceptible to modification, alteration, changes or substitution without departing significantly from the spirit of the invention. For example, the dimensions, number, size and shape of the various components may be altered to fit specific applications. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and that one or more steps illustrated may be optional in accordance with aspects of the disclosure. Accordingly, the specific embodiments illustrated and described herein are for illustrative purposes only and the invention is not limited except by the following claims and their equivalents. Aspects of the disclosure have been described in terms of illustrative embodiments thereof. The description is thus to be regarded as illustrative instead of restrictive on the present disclosure.

What is claimed is:

1. A dispenser comprising:
   one or more processors;
   one or more computer readable media storing computer-executable instructions configured to, with the one or more processors, cause the dispenser to:
      provide a display screen that is arranged to allow a user to select and cause dispensing of a custom beverage using a progression starting from a top region of the display screen and ending at a bottom region of the display screen, wherein the display screen includes:
         a first region comprising a plurality of icons that represent brands of beverages available for dispensing from the dispenser as part of the custom beverage;
         a second region comprising a plurality of modifier buttons that represent flavorings or additives available for dispensing from the dispenser as part of the custom beverage; and
         a third region comprising a pour button that causes the dispenser to dispense the custom beverage.

2. The dispenser of claim 1, wherein the first region is located above the second region and the third region in the display screen, and the second region is located above the third region in the display screen.

3. The dispenser of claim 1, wherein the display screen comprises a touch screen.

4. The dispenser of claim 1, wherein the first region, the second region, and the third region are simultaneously displayed.

5. The dispenser of claim 1, wherein the one or more computer readable media further stores computer-executable instructions configured to, with the one or more processors, cause the dispenser to:
   receive a selection of a first icon of the plurality of icons, the first icon representing a brand of beverage;
   receive an actuation of a first modifier button of the plurality of modifier buttons, the first modifier button representing a flavoring;
   receive an actuation of the pour button;
   as a response to actuation of the pour button, cause a user-selected beverage to be dispensed by the dispenser, the user-selected beverage including the brand of beverage and the flavoring.

6. The dispenser of claim 5, wherein icons appearing in front of the carousel represent historically most popular selections for that dispenser.

7. The dispenser of claim 1, wherein the plurality of icons form a part of a rotating carousel in the first region, and the plurality of icons represent all of the brands of beverages available for dispensing from the dispenser.

8. The dispenser of claim 1, wherein the plurality of icons includes a first icon that overlaps a second icon while simultaneously displaying all brands of beverages available for dispensing from the dispenser.

9. The dispenser of claim 1, wherein the display screen includes a fourth region, the fourth region comprising a plurality of buttons, each of the plurality of buttons describing a desired property for brands of beverages that are visible in the first region.

10. The dispenser of claim 1, wherein the dispenser further comprises one or more mixing chambers, an ingredient system and a doser unit.

11. An apparatus comprising:
one or more processors;
one or more computer readable media storing computer-executable instructions configured to, with the one or more processors, cause the apparatus to:
  display, on a display screen, one or more types of products for dispensing from the apparatus and one or more modifiers to the one or more types of products, wherein each of the modifiers represents an item that can be added to a product when the product is being dispensed by the apparatus;
  while displaying the one or more types of products and the one or more modifiers, receive input selecting a first type of the one or more types of products; and
  while displaying the one or more types of products and the one or more modifiers, receive input selecting a first modifier of the one or more modifiers to the one or more types.

12. The apparatus of claim 11, wherein the one or more computer readable media further stores computer-executable instructions configured to, with the one or more processors, cause the apparatus to:
  while displaying the one or more types of products and the one or more modifiers, receive input directing the apparatus to dispense a combination of the first type of product and the first modifier.

13. The apparatus of claim 12, wherein the apparatus is configured to dispense the combination of the first type of product and the first modifier.

14. The apparatus of claim 13, wherein the combination of the first type of product and the first modifier is a custom beverage.

15. The apparatus of claim 11, wherein the one or more types of products are displayed at a first region of the display screen, and the one or more modifiers to the one or more types are displayed at a second region of the display screen, wherein the first region is located above the second region.

16. The apparatus of claim 11, wherein each of the one or more types of products represents a beverage type or brand, and each of the one or more modifiers represents a flavoring or additive.

17. The apparatus of claim 11, wherein the one or more types of products are displayed in a carousel arrangement.

18. The apparatus of claim 11, wherein the one or more types of products are displayed in a matrix arrangement.

19. The apparatus of claim 11 further comprising one or more mixing chambers, an ingredient system and a doser unit.

* * * * *